(12) United States Patent
Gangumalla et al.

(10) Patent No.: US 10,593,176 B2
(45) Date of Patent: Mar. 17, 2020

(54) USING PRESSURE SENSORS IN A SECURITY SYSTEM

(71) Applicant: InvenSense, Inc., San Jose, CA (US)

(72) Inventors: Vamshi Gangumalla, San Jose, CA (US); Sankalp Dayal, Fremont, CA (US); Calin Miclaus, San Jose, CA (US); Karthik Katingari, San Jose, CA (US); Rob Dick, San Jose, CA (US); Paul Schreier, Boston, MA (US)

(73) Assignee: InvenSense, Inc., San Jose, CA (US)

( * ) Notice: Subject to any disclaimer, the term of this patent is extended or adjusted under 35 U.S.C. 154(b) by 0 days.

(21) Appl. No.: 16/190,209

(22) Filed: Nov. 14, 2018

(65) Prior Publication Data

US 2019/0088098 A1   Mar. 21, 2019

Related U.S. Application Data

(63) Continuation-in-part of application No. 15/832,456, filed on Dec. 5, 2017, which is a continuation-in-part of application No. 15/418,603, filed on Jan. 27, 2017, now abandoned, and a continuation-in-part of application No. 14/498,896, filed on Sep. 26, 2014, now Pat. No. 9,588,006.

(60) Provisional application No. 62/672,030, filed on May 15, 2018, provisional application No. 62/615,403, filed on Jan. 9, 2018, provisional application No. 62/430,098, filed on Dec. 5, 2016.

(51) Int. Cl.
| | | |
|---|---|---|
| *H04N 7/18* | (2006.01) | |
| *G08B 13/20* | (2006.01) | |
| *G01L 13/06* | (2006.01) | |
| *G08B 13/08* | (2006.01) | |
| *G01L 19/12* | (2006.01) | |
| *G01L 19/02* | (2006.01) | |
| *G01L 27/00* | (2006.01) | |
| *G01P 13/00* | (2006.01) | |
| *G08B 29/24* | (2006.01) | |

(52) U.S. Cl.
CPC .............. *G08B 13/20* (2013.01); *G01L 13/06* (2013.01); *G01L 19/02* (2013.01); *G01L 19/12* (2013.01); *G01L 27/005* (2013.01); *G08B 13/08* (2013.01); *G01P 13/00* (2013.01); *G08B 29/24* (2013.01)

(58) Field of Classification Search
None
See application file for complete search history.

(56) References Cited

U.S. PATENT DOCUMENTS

| | | | |
|---|---|---|---|
| 5,109,216 A | * | 4/1992 | Yarbrough ............. G08B 13/20 340/522 |
| 9,588,006 B2 | | 3/2017 | Heshmati et al. |
| 2014/0102169 A1 | | 4/2014 | Yoneyama |
| 2015/0039249 A1 | | 2/2015 | Heinrich et al. |
| 2015/0127287 A1 | | 5/2015 | Wolf et al. |

(Continued)

*Primary Examiner* — Brent Swarthout

(57) ABSTRACT

A security system for a building comprises a pressure sensor and a computer system communicatively coupled with the pressure system. The pressure sensor coupled to a movable portion of a window in the building. The computer system is configured to: receive a first pressure measurement from the pressure sensor; compare the first pressure measurement to a reference pressure measurement; and based on the comparison, detect that the movable portion of the window has moved.

29 Claims, 22 Drawing Sheets

(56) References Cited

U.S. PATENT DOCUMENTS

| | | |
|---|---|---|
| 2016/0091385 A1 | 3/2016 | Heshmati et al. |
| 2017/0011616 A1* | 1/2017 | Britton ................. G08B 25/008 |
| 2017/0019639 A1* | 1/2017 | Bae ......................... H04N 7/18 |
| 2017/0234756 A1 | 8/2017 | Youssef et al. |
| 2018/0047265 A1* | 2/2018 | Rodolico ............... G08B 21/10 |
| 2018/0094998 A1* | 4/2018 | Youssef ................ G01L 27/005 |
| 2018/0180413 A1* | 6/2018 | Singh ...................... G01C 9/00 |

* cited by examiner

1700

RECEIVING, BY A COMPUTER SYSTEM, A FIRST PRESSURE MEASUREMENT FROM A PRESSURE SENSOR COUPLED WITH THE MOVABLE PORTION OF THE WINDOW
1710

COMPARING, BY THE COMPUTER SYSTEM, THE FIRST PRESSURE MEASUREMENT TO A REFERENCE PRESSURE MEASUREMENT
1720

BASED ON THE COMPARISON, DETECTING THAT THE MOVABLE PORTION OF THE WINDOW HAS MOVED
1730

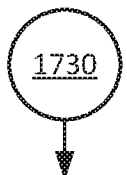

RESPONSIVE TO THE DETECTING THAT THE MOVABLE PORTION OF THE WINDOW HAS MOVED, ACTIVATING, BY THE COMPUTER SYSTEM, AN INERTIAL SENSOR COUPLED TO THE MOVING PORTION OF THE WINDOW
1750

RECEIVING AN INERTIAL MEASUREMENT FROM THE INERTIAL SENSOR
1760

RESPONSIVE TO THE INERTIAL MEASUREMENT INDICATING MOVEMENT OF THE WINDOW, VALIDATING THE DETECTION THAT THE MOVABLE PORTION OF THE WINDOW HAS MOVED
1770

FIG. 17C

USING PRESSURE SENSORS IN A SECURITY SYSTEM

CROSS REFERENCE TO RELATED APPLICATIONS—PROVISIONAL

This application claims priority to and benefit of co-pending U.S. Provisional Patent Application No. 62/615,403 filed on Jan. 9, 2018 entitled "Method and System for Using Pressure Sensors in Home Security" by Vamshi Gangumalla, Calin Miclaus, Karthik Katingari, Rob Dick, and Paul Schreier, which is assigned to the assignee of the present application. The disclosure of U.S. Provisional Patent Application No. 62/615,403 is hereby incorporated herein by reference in its entirety.

This application claims priority to and benefit of co-pending U.S. Provisional Patent Application No. 62/672,030 filed on May 15, 2018 entitled "Method and System for Using Pressure Sensors in Home Security" by Vamshi Gangumalla, Calin Miclaus, Karthik Katingari, Rob Dick, Paul Schreier, and Sankalp Dayal which is assigned to the assignee of the present application. The disclosure of U.S. Provisional Patent Application No. 62/672,030 is hereby incorporated herein by reference in its entirety.

CROSS REFERENCE TO RELATED APPLICATIONS—CONTINUATION-IN-PART

This application is a continuation-in-part application of and claims priority to and benefit of U.S. patent application Ser. No. 15/832,456 filed on Dec. 5, 2017 entitled "Systems and Methods Differential Pressure Sensing" by Joe Youssef, Hemabh Shekhar, Karthik Katingari, William Kerry Keal, and Mubbasher Muktar, and which is assigned to the assignee of the present application.

Application Ser. No. 15/832,456 claims priority to and is a continuation-in-part of application Ser. No. 14/498,896, filed on Sep. 26, 2014, now U.S. Pat. No. 9,588,006.

Application Ser. No. 15/832,456 is also a continuation-in-part of and claims priority to application Ser. No. 15/418,603, filed on Jan. 27, 2017 now abandoned.

Application Ser. No. 15/832,456 claims priority to provisional application No. 62/430,098, filed on Dec. 5, 2016.

BACKGROUND

Pressure sensors may be used in a wide variety of applications to measure relative or absolute altitude through the analysis of changes in the atmospheric pressure. The development of microelectromechanical systems (MEMS) and MEMS sensors has enabled the incorporation of a wide variety of small sensors into various structures and/or devices to include mobile devices such as cell phones, laptops, tablets, gaming devices and other portable, electronic devices.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 17A-17C illustrate a flow diagram of an example method of detecting movement of a movable portion of a window in a building, according to various embodiments.

DESCRIPTION OF EMBODIMENTS

Figure 1:
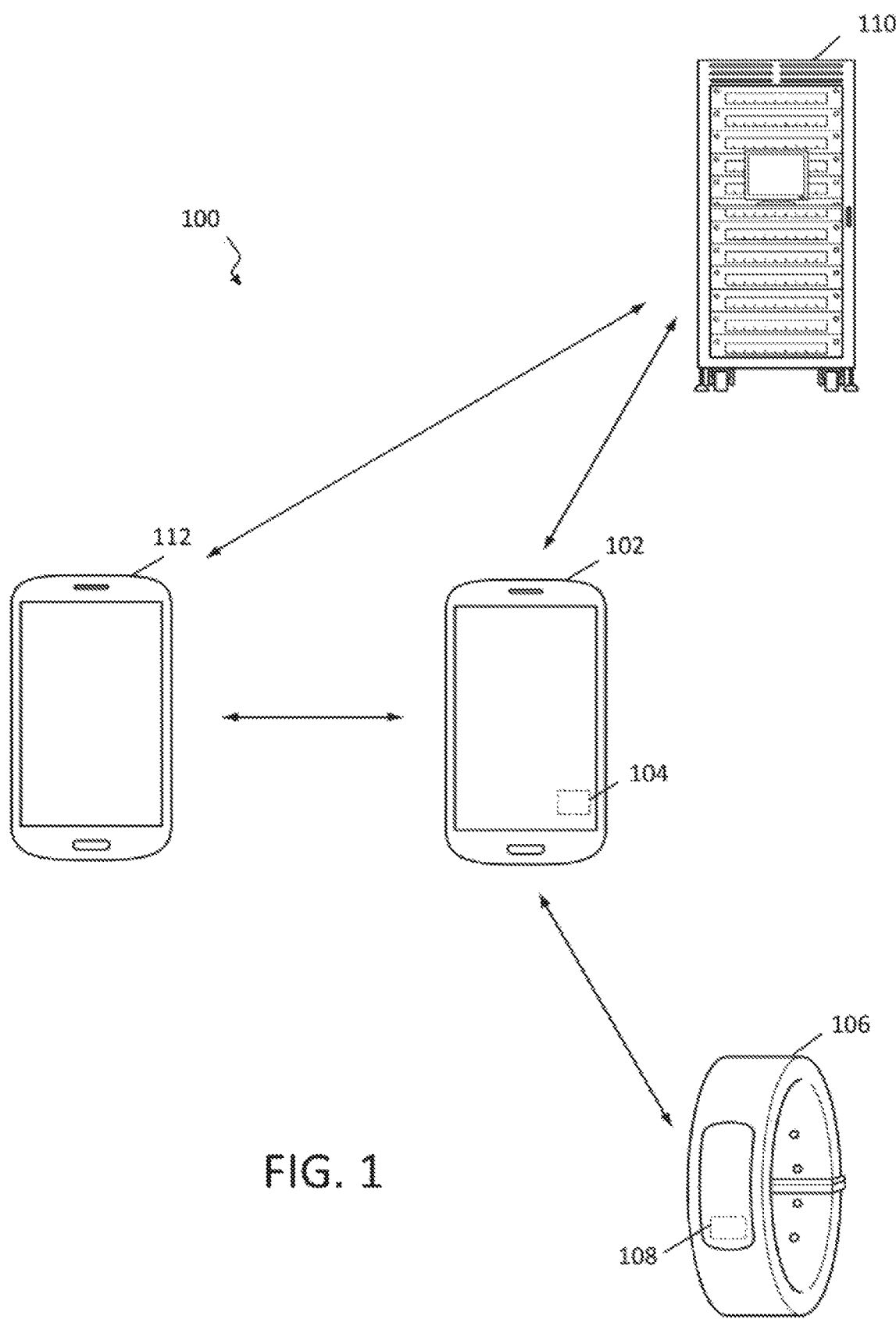
FIG. 1 is schematic diagram of a pressure sensor correction system according to an embodiment.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Overview of Discussion

As described herein, one or more pressure sensors are utilized (sometimes with one or other types of sensors) to measure the position of a window or a door in a building. For example, pressure sensors will be described herein as being used to measure whether a window is closed or, if open, how much the window is opened. By coupling a pressure sensor with a movable portion of a window, such as the portion which slides up and down, and comparing a pressure measurement acquired from the pressure sensor with a reference/benchmark pressure measurement, noted differences and/or changes between the acquired and reference/benchmark pressure measurement can be used to determine that the sliding portion of the window has moved up or down (and by how much the sliding portion has moved up or down). The pressure sensors utilized in these techniques, are often very accurate and can detect pressure changes associated with moving up or down in elevation/height/altitude of 5 cm and sometimes even less.

As described herein, a pressure sensor may be implemented as a Micro Electro Mechanical System (MEMS). An example pressure sensor utilized as one or more of the pressure sensors (104 and 108 described herein) may be a pressure sensor from TDK/InvenSense from the ICP-101xx series or ICM-207XX series, both of which are based on micro-electro-mechanical (MEM) capacitive technology. The ICP-101xx series includes only a pressure sensor, while the ICM-207XX series (e.g., ICM-20789) packages a 3-axis gyroscope and a 3-axis accelerometer together in single package with a pressure sensor. Such pressure sensors are very small, very accurate, and can easily be incorporated into an integrated circuit or "chip" either alone or with components such as one or more or other components such as a sensor processor, a memory, and one or more other sensors. This integrated circuit may be a stand-alone integrated circuit, disposed as a portion of a larger integrated circuit, disposed as a portion of an electronic device, and/or coupled with an electronic device other structure such as a door, wall, window, or the like. Because of their small size, in some instances less than four millimeters cubically, and in other instances a couple millimeters or less cubically, these MEMS pressure sensors (and circuits within which they are incorporated) can be used in locations where a conventional pressure sensor would not fit. Additionally, because of their high accuracy, these pressure sensors can detect changes in pressure associated with altitude/elevation/height changes of as little as 1 Pascal or about 5 centimeters (and in some instances less).

Example embodiments described herein, improve the usability of electronic equipment and devices to include, but not limited, improving the functionality and/or efficiency of security systems. In some embodiments, the technology described herein may increase power efficiency of a security system by facilitating the use of lower power pressure sensors in place of other sensors that consume more power. In some embodiments, the technology described herein may improve the security of a building by incorporating pressure sensors in place of magnetic reed sensors or other sensors which are easier for an intruder to detect and/or defeat when trying to open a window or a door which has its position monitored by such sensors. In some embodiments, the technology described herein may improve the ability of a security system to monitor an aperture/opening (e.g., a door or window) by measuring how much a door or window is open rather than a conventional binary monitoring of whether the door or window is either open or closed. That is, a pressure sensor can be utilized to detect movement from an intermediate position, not just from a closed position to a position that is "not closed." Similarly, the technology described herein may improve the ability of a security system to detect or confirm, via changing pressure, a slowly opened aperture (e.g., a door or window) whose slow movement might go undetected by a motion sensor such as an accelerometer.

Discussion begins with Notation and Nomenclature, continues with description of the use of pressure sensors in electronic devices, and concludes with description of the use of pressure sensors in security systems.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In some instances, well known structures and devices are shown in block diagram form in order to avoid obscuring the novelty of the example embodiments presented herein. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "accessing," "receiving," "sending," "using," "selecting," "determining," "normalizing," "multiplying," "averaging," "monitoring," "comparing," "applying," "updating," "measuring," "deriving," "detecting," "triggering," "allowing," "disallowing," "activating," "validating," "comparing," "combining," "weighting," "averaging," "fusing," or the like, refer to the actions and processes of an electronic device such as: a sensor processing unit, a sensor processor, a host processor, a processor, a sensor, a memory, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example electronic device(s) such as servers, computer systems, devices, smart speaker hubs, home security systems, and others described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable data storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more sensor processing units (SPUs), sensor processor(s), host processor(s) or core(s) thereof, application specific integrated circuits (ASICs), application specific instruction set processors (ASIPs), field programmable gate arrays (FPGAs), digital signal processor (DSP), motion processing unit (MPU), sensor processing unit (SPU), graphics processing unit (GPU), processing core, controller, microcontroller, state machine, or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A processor may also be implemented as a combination of computing devices, e.g., a combination of an SPU and a microprocessor, a plurality of microprocessors, one or more microprocessors in conjunction with an SPU core, or any other such configuration.

In the described embodiments, a chip is defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. In some configurations, a substrate portion known as a MEMS cap provides mechanical support for the MEMS structure. The MEMS structural layer is attached to the MEMS cap. The MEMS cap is also referred to as handle substrate or handle wafer. In the described embodiments, an electronic device incorporating a sensor may employ a sensor tracking module also referred to as Sensor Processing Unit (SPU) that includes at least one sensor in addition to electronic circuits. The sensor, such as a gyroscope, a magnetometer, an accelerometer, a microphone, a pressure sensor, a proximity sensor, or an ambient light sensor, among others known in the art, are contemplated. Some embodiments include accelerometer, gyroscope, and magnetometer, which each provide a measurement along three axes that are orthogonal to each other. Such a device is often referred to as a 9-axis device. Other embodiments may not include all the sensors or may provide measurements along one or more axes. The sensors may be formed on a first substrate. Other embodiments may include solid-state sensors or any other type of sensors. The electronic circuits in the SPU receive measurement outputs from the one or more sensors. In some embodiments, the electronic circuits process the sensor data. The electronic circuits may be implemented on a second silicon substrate. In some embodiments, the first substrate may be vertically stacked, attached and electrically connected to the second substrate in a single semiconductor chip, while in other embodiments, the first substrate may be disposed laterally and electrically connected to the second substrate in a single semiconductor package.

In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

In the described embodiments, raw data refers to measurement outputs from the sensors which are not yet processed. Motion data may refer to processed and/or raw data. Processing may include applying a sensor fusion algorithm or applying any other algorithm. In the case of a sensor fusion algorithm, data from a plurality of sensors may be combined to provide, for example, an orientation of the device. In the described embodiments, a SPU may include processors, memory, control logic and sensors among structures.

Pressure Sensors in Mobile Electronic Devices

These and other aspects may be appreciated in the context of FIG. 1, which shows example embodiments in the context of system 100. Mobile device 102 may include an integrated pressure sensor 104 and/or may be associated with auxiliary device 106 having a pressure sensor 108, communicating over a suitable protocol. As will be described below, sensor data and/or other information may be shared between mobile device 102 and auxiliary device 106 to facilitate correction of pressure sensor 104 and/or pressure sensor 108. The techniques of this disclosure involve correction of a pressure sensor based on differential pressure measurements, such as from pressure sensor 104 and pressure sensor 108. Generally, the reference pressure information may be obtained from auxiliary device 106, such that the reference pressure information may be expected to correlate with ambient pressure. Notably, the reference pressure information may be expected to reflect global changes in pressure that affect both auxiliary device 106 and mobile device 102. In some embodiments, both mobile device 102 and auxiliary device 106 may be mobile and subject to changes in elevation. As will be discussed in further detail below, the roles performed by mobile device 102 and auxiliary device 106 may be dynamically assigned or reassigned in such embodiments, so that any one device may be used to provide reference pressure information to another device. In other embodiments, auxiliary device 106 may be temporarily or permanently fixed in position, such that it may be assumed to be the source of reference pressure information.

In one embodiment, mobile device 102 and auxiliary device 106 may be a smart phone and a wearable, such as a watch, fitness band, or the like. Mobile device 102 and auxiliary device 106 may communicate using a personal area network (PAN), such as a protocol employing wireless communication, such as BLUETOOTH®, ZigBee®, ANT, near field communication (NFC), infrared (IR) or other technology adapted for relatively short-range, power efficient wireless communication. Similarly, a Wireless Local Area Network (WLAN), such as one conforming to Institute for Electrical and Electronic Engineers (IEEE) 802.11 protocols, or other systems including cellular-based and WLAN technologies such as Universal Terrestrial Radio Access (UTRA), Code Division Multiple Access (CDMA) networks, Global System for Mobile Communications (GSM), IEEE 802.16 (WiMAX), Long Term Evolution (LTE), other transmission control protocol, internet protocol (TCP/IP) packet-based communications, or the like may also be used. Still further, in some applications, a suitable wired connection protocol may be employed as desired. Although mobile device 102 and auxiliary device 106 may be associated simply by being in communication together, in some embodiments the device may be coordinated in a joint application. Specific examples include those in which mobile device 102 is configured as a drone or other vehicle and auxiliary device 106 functions as a remote controller. As another illustration, mobile device 102 may be a head mounted display (HMD) and auxiliary device 106 may be a suitable input device. The techniques of this disclosure are not limited to these embodiments and may be applied in many other contexts.

Mobile device 102 may have location awareness capabilities and may communicate information regarding its determined position to a source of external reference pressure information, as represented by server 110 or another mobile device 112. In some embodiments, device 102 may receive reference pressure information from the external source based on the determined position. Device 102 may then use the received reference pressure information to correct the pressure sensor. As will be appreciated, server 110 may have a database to correlate location with pressure information, such as may be maintained from weather stations, including National Oceanic and Atmospheric Administration (NOAA) or National Climatic Data Center (NCDC) stations, news stations, airports, or any other suitable source of meteorological information. Server 110 may, additionally or in the alternative, function to aggregate pressure information data in a "crowd-sourced" fashion from other mobile devices, such as device 112. When device 112 has an acceptably calibrated pressure sensor, it may upload pressure information measurements and corresponding location information to be used as reference pressure information to server 110. Subsequently, server 110 may then distribute reference pressure information to mobile device 102 depending upon its determined position. Pressure information includes atmospheric pressure data and may also include data associated with any number of related environmental conditions, such as temperature, humidity, and the like. In other embodiments, sensor data from one of pressure sensor 104 or pressure sensor 108, optionally in conjunction with other information, may be used as reference pressure information by the other sensor to provide differential pressure sensing.

Upon receipt of reference pressure information, device 102 may correct its pressure sensor 104 and/or pressure sensor 108 on auxiliary device 106 may be corrected, as warranted. In one aspect, device 102 may use reference pressure information corresponding to multiple adjacent locations by performing a suitable weighting operation to interpolate or extrapolate a suitable atmospheric pressure reference measurement for its determined position. In another aspect, device 102 may compensate the received reference pressure information using locally-sensed environmental conditions, such as temperature and/or humidity. Device 102 may receive pressure information used for correction from an individual source or any combination and number of external sources, including auxiliary device 106 as well as other sources such as other device 112 and server 110. In one aspect, reference pressure information may be contemporaneous within a suitable margin. In another aspect, reference pressure information may correspond to a time period different from when device 102 corrects its pressure sensor. In another aspect, server 110 may use reference pressure information corresponding to multiple adjacent locations by performing a suitable weighting operation to interpolate or extrapolate a suitable atmospheric pressure reference measurement for the determined position of device 102. As warranted, device 102 may apply a compensation based on temperature and/or humidity, or other environmental condition characteristic as described in further detail below when employing non-contemporaneous reference pressure information.

Figure 2:
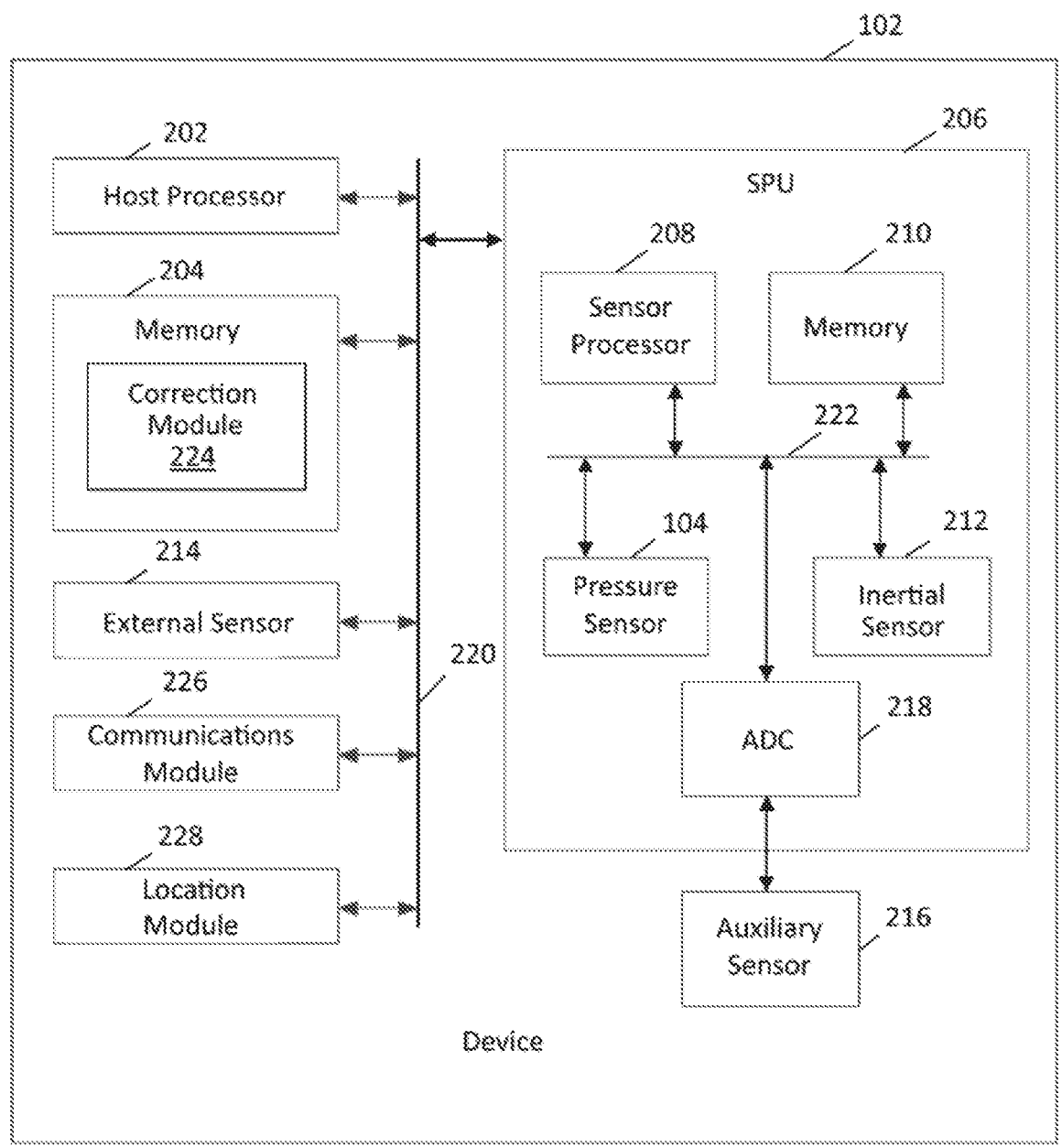
FIG. 2 is schematic diagram of a mobile device with a pressure sensor according to an embodiment.

Details regarding one embodiment of system including mobile electronic device 102 including features of this disclosure are depicted as high-level schematic blocks in FIG. 2. As will be appreciated, device 102 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices. In some embodiments, mobile device 102 may be implemented as a head mounted display (HMD), either as a dedicated HMD or other augmented reality (AR)/virtual reality (VR) device, or may be another portable device having capabilities that may be leveraged to provide some degree of functionality associated with a HMD, including those noted above.

As shown, device 102 includes a host processor 202, which may be one or more microprocessors, central processing units (CPUs), or other processors to run software programs, which may be stored in memory 204, associated with the functions of device 102. Multiple layers of software can be provided in memory 204, which may be any combination of computer readable medium such as electronic memory or other storage medium such as hard disk, optical disk, etc., for use with the host processor 202. For example, an operating system layer can be provided for device 102 to control and manage system resources in real time, enable functions of application software and other layers, and interface application programs with other software and functions of device 102. Similarly, different software application programs such as menu navigation software, games, camera function control, navigation software, communications software, such as telephony or WLAN software, or any of a wide variety of other software and functional interfaces can be provided. In some embodiments, multiple different applications can be provided on a single device 102, and in some of those embodiments, multiple applications can run simultaneously. As one example, a motion algorithm layer can provide motion algorithms that provide lower-level processing for raw sensor data provided from the motion sensors and other sensors. A sensor device driver layer may provide a software interface to the hardware sensors of device 102. Further, a suitable application program interface (API) may be provided to facilitate communication between host processor 202 and SPU 206, for example, to transmit desired sensor processing tasks. Other embodiments may feature any desired division of processing between SPU 206 and host processor 202 as appropriate for the applications and/or hardware being employed. For example, lower level software layers may be provided in SPU 206 and an API layer implemented by host processor 202 may allow communication of the states of application programs as well as sensor commands.

Device 102 includes at least one sensor assembly, as shown here in the form of integrated sensor processing unit (SPU) 206 featuring sensor processor 208, memory 210 and pressure sensor 104. Memory 210 may store algorithms, routines or other instructions for processing data output by pressure sensor 104 and/or other sensors as described below using logic or controllers of sensor processor 208, as well as storing raw data and/or motion data output by pressure sensor 104 or other sensors. Memory 210 may also be used for any of the functions associated with memory 204. In addition to pressure sensor 104, inertial sensor 212 may be one or more sensors for measuring motion of device 102 in space, such as an accelerometer, a gyroscope, a magnetometer, or others. Depending on the configuration, SPU 206 measures one or more axes of rotation and/or one or more axes of acceleration of the device. In one embodiment, inertial sensor 212 may include rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208, or other processing resources of device 102, combines data from inertial sensor 212 to provide a six axes determination of motion or six degrees of freedom (6 DOF). As desired, inertial sensor 212 may be implemented using Micro Electro Mechanical System (MEMS) to be integrated with SPU 206 in a single package. Example details regarding suitable configurations of host processor 202 and SPU 206 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPU 206 in device 102 are available from InvenSense, Inc. of Sunnyvale, Calif.

Alternatively, or in addition, device 102 may implement a sensor assembly in the form of external sensor 214. This is optional and not required in all embodiments. External sensor may represent one or more sensors as described above, such as a pressure sensor, an accelerometer and/or a gyroscope. As used herein, "external" means a sensor that is not integrated with SPU 206 and may be remote or local to device 102. In this embodiment, external sensor 214 may output sensor data in a digital format. Also, alternatively or in addition, SPU 206 may optionally receive data from an auxiliary sensor 216 configured to measure one or more aspects about the environment surrounding device 102. In this embodiment, auxiliary sensor 216 is configured as an analog device, and provides output to analog to digital converter (ADC) 218, which may be integrated with SPU 206 or may be a separate component.

In the embodiment shown, host processor 202, memory 204, SPU 206, external sensor 214 and other components of device 102 may be coupled through bus 220, while sensor processor 208, memory 210, pressure sensor 104, inertial sensor 212 and/or ADC 218 may be coupled though bus 222, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 102, such as by using a dedicated bus between host processor 202 and memory 204.

Algorithms, routines or other instructions for processing sensor data may be employed by correction module 224 to perform any of the operations associated with the techniques of this disclosure, such as receiving reference pressure information and correcting pressure sensor 104. Further, determining the motion or orientation of portable device 102. Although this embodiment is described in the context of pressure sensor 104, inertial sensor 212, external sensor 214 and auxiliary sensor 216, any suitable architecture may be employed to implement any combination of sensors, such as accelerometers, gyroscopes, magnetometers, pressure sensors, microphones, proximity, and ambient light sensors, and temperature sensors among others sensors, internal or externally and as digital or analog devices. Any combination of sensor information may be involved in sensor fusion or similar operations performed by SPU processor 208 to provide a four axis, a seven axis, a ten axis or other combination determination of motion by fusing the vertical axis estimated by information from pressure sensor 104 with 3-axis gyroscopes, accelerometers and/or magnetometers. In other embodiments, some, or all, of the processing and calculation may be performed by the host processor 202, which may be using the host memory 204, or any combination of other processing resources. In one aspect, implementing correction module 224 in SPU 206 may allow the operations described in this disclosure to be performed with reduced or no involvement of host processor 202. As will be appreciated, this may provide increased power efficiency and/or may free host processor 202 to perform any other task(s). However, the functionality described as being performed by correction module 224 may be implemented using host processor 202 and memory 204 as indicated in FIG. 2 or any other combination of hardware, firmware and software or other processing resources available in portable device 102.

Portable device 102 may also include communications module 226 to receive reference pressure information, such as from auxiliary device 106 as well as other suitable sources. Any suitable wireless or wired protocol may be used, including those noted above. Communications module 226 may also be employed to exchange information regarding one or more condition characteristics that influence the operations performed by correction module 224. As will be described in further detail below, a condition characteristic may affect the pressure being measured by pressure sensor 104 and/or pressure sensor 108, and thus be determined with respect to mobile device 102, auxiliary device 106 or both. Correction module 224 may also use communications module 226 to transmit information determined by pressure sensor 104 after it has been suitably calibrated, as well as information from any other sensors as desired, together with a determined position to server 110 or other device 112 for use as reference pressure information.

Further, device 102 may also feature location awareness capabilities, such as may be provided by location module 228. In general, location awareness refers to the use of any suitable technique to determine the geospatial position of device 102. One of skill in the art will appreciate that any number of technologies may be implemented as desired. Without limitation, examples of suitable location awareness methods include global navigation satellite systems (GNSS), such as global positioning system (GPS), global navigation satellite system (GLONASS), Galileo and Beidou, as well as WiFi™ positioning, cellular tower positioning, Bluetooth™ positioning beacons, dead reckoning or other similar methods. Location module 228 provides a determination of the position of device 102 with sufficient resolution to enable identification of relevant reference pressure information according to the techniques of this disclosure. As will be appreciated, this may include a determination of altitude in addition to latitude and longitude. In one aspect, location module 228 may determine the position of device 102 based on the proximity indicated by the communication module 226. For example, the communications protocol employed may be associated with a defined range such that the ability of device 102 to communicate with another device represents sufficient proximity to the other device, such as auxiliary device 106, to utilize its reference pressure information in a correction process.

As illustration only and without limitation, correction module 224 may be implemented as any suitable combination of hardware and software to process reference pressure information to perform one or more correction routines with respect to pressure sensor 104. As desired, correction module 224 may adjust, calibrate, compensate or otherwise alter measurements of pressure sensor 104 using reference pressure information from auxiliary device 106 as well as from other sources. Such reference pressure information may correspond to the position determined for device 102 by location module 228. For example, correction module 224 may determine offset values by subtracting a reference pressure and the pressure measured by pressure sensor 104. Other suitable parameters determined by correction module 224 may include sensitivity, linearity and/or coefficients associated with related environmental variables such as temperature or humidity. Correction module 224 may also use reference pressure information corresponding to multiple adjacent locations by performing a suitable weighting operation to interpolate or extrapolate a suitable atmospheric pressure reference measurement for its determined position. In another aspect, correction module 224 may compensate the received reference pressure information using locally-sensed environmental condition characteristics, such as temperature and/or humidity. Further, the reference pressure information may be contemporaneous within a suitable margin or may correspond to a different time period. When employing non-contemporaneous reference pressure information, a compensation based on one or more environmental condition characteristics, such as temperature and/or humidity, may be applied. Aspects of correction module 224 may be implemented in software, which includes, but is not limited to, application software, firmware, resident software, microcode, etc., and may take the form of a computer program product accessible from a computer-usable or computer-readable medium providing program code for use by or in connection with a computer or any instruction execution system, such as host processor 202, sensor processor 208 or any other processing resources of device 102.

In a further aspect, correction module 224 may be configured to determine a condition characteristic for device 102 and adjust correction operations accordingly. In addition to the inertial or other motion sensors, pressure sensors may also be used to determine a height or elevation or a change in height or elevation. As used herein, the term determining altitude may involve either an absolute height estimation, a relative height estimation and/or an estimation of change in height. However, pressure sensors are also sensitive to other influences that change the barometric pressure and temperature. For example, in outside situations, the wind may influence the pressure sensor reading, while indoor locations may experience fluctuations in air pressure, e.g., due to air conditioning changes. Accordingly, aspects of techniques of this disclosure include determining one or more condition characteristics to be used when correcting pressure sensor information. In general, anything that may affect the pressure being measured is considered a condition characteristic and, once determined, may be used as warranted to improve the correction. For example, it may be expected that there will be greater changes in ambient pressure for indoor locations, so when an environmental condition characteristic indicates mobile device 102 is indoors, pressure sensor 104 may be corrected with the reference pressure information.

In this context, a condition characteristic is anything that may be predicted to perturb or alter the pressure sensor data. A given condition characteristic may apply to either or both mobile device 102 and auxiliary device 106. One class of condition characteristic may relate to usage. For example, if device 102 includes a transceiver, ongoing transmissions may cause an increase in temperature of the device. As another example, operation of device 102 may affect the local pressure directly, such as when device 102 is implemented as a drone, given that the pressure measured by pressure sensor 104 may be related to rotor speed. Another class of condition characteristic may relate to environmental aspects. For example, when device 102 is determined to be in a pocket or other enclosed location, this condition characteristic may be determined so that confidence in the validity of pressure measurements may be reduced. As another illustration, a light sensor may be used to distinguish between operation in sun versus shade, with the expectation that a difference in temperature may exist that affects the measurements of pressure sensor 104. Still further, a condition characteristic may be determined directly or indirectly from location module 228. In one embodiment, location module 228 may determine a position with sufficient accuracy to allow correction module 224 to assume device 102 is in an indoor location or other position expected to impact measured pressure. As another example, location module 228 may involve GNSS such that an analysis of the number and quality of received signals may allow a determination that device 102 is indoors rather than outdoors. In yet another aspect, inertial sensor 212 may be used to determine a condition characteristic of device 102. Correspondingly, depending upon the determined condition characteristic, correction module 224 may apply a compensation, defer correction to a more advantageous time or perform any other operation that may be warranted by the anticipated effect of the condition characteristic on pressure sensor 104.

Figure 3:
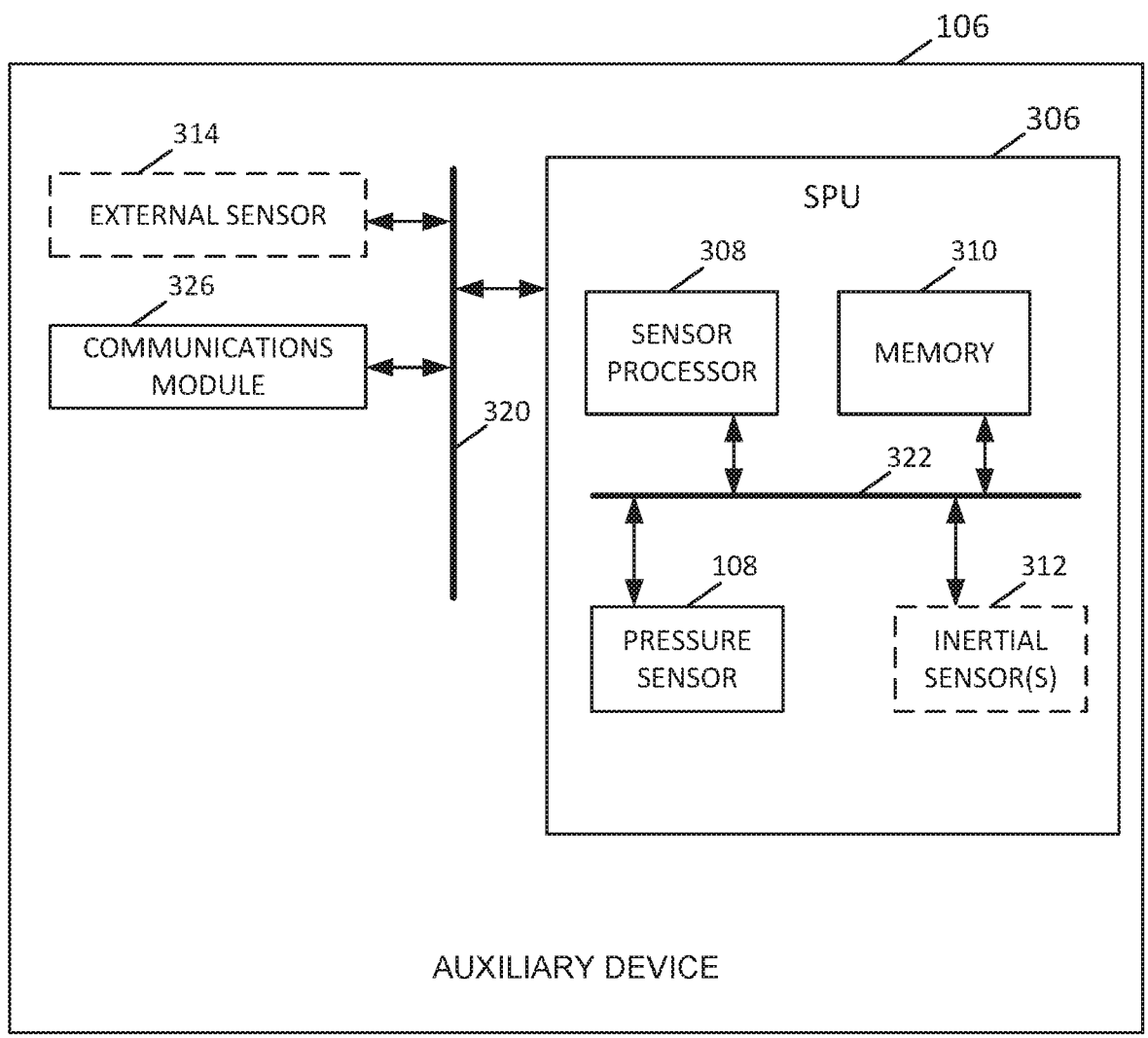
FIG. 3 is schematic diagram of a mobile device with an associated auxiliary device having a pressure sensor according to an embodiment.

As noted above, mobile device 102 may receive reference pressure information from associated auxiliary device 106. Depending on the embodiment, auxiliary device 106 may have functional components similar to those described above with respect to mobile device 102 as schematically depicted in FIG. 3. Auxiliary device 106 may be associated with mobile device 102 such as in the use cases of a wearable being employed together with a smart phone, a controller for piloting a drone, a base station and/or user input device controlling an HMD, or many other applications. In one aspect, auxiliary device 106 may be sufficiently proximate when associated with device 102 so that position determinations made by device 102 also correspond to auxiliary device 106. Accordingly, auxiliary device 106 may be within a range of approximately 10 m in one embodiment. In other embodiments, such as when mobile device 102 is configured as a drone or other vehicle, the range may be increased, but still sufficiently close to allow an assumption that conditions affecting the ambient pressure at the location of auxiliary device 106 relate to the conditions affecting the ambient pressure at the location of mobile device 102. As such, auxiliary device 106 may include sensor processing unit (SPU) 306. SPU 306 includes sensor processor 308, memory 310, and pressure sensor 108 coupled by bus 322. In some embodiments, auxiliary device 106 also includes a communications module 326. The communications module 326 may be incorporated into SPU 306 or may be coupled, such as by bus 320, with SPU 306.

Sensor processor 308 may be similar or identical in specification to the previously described sensor processor 208 of device 102. Memory 310 may be similar or identical in specification to the previously described memory 210 of device 102. Pressure sensor 108 may be similar or identical in specification to the previously described pressure sensor 104 of device 102. Bus 322 may be similar or identical in specification to the previously described bus 222 of device 102. Bus 320, when included, may be similar or identical to the previously described bus 220 of device 102. Communications module 326, when included, may be similar or identical to the previously described communications module 226 of device 102.

In some embodiments, auxiliary device 106 may include one or more additional sensors, such as inertial sensor(s) 312 and/or external sensor 314 as desired. Inertial sensor(s) 312 may be similar or identical in specification to the previously described inertial sensor(s) 212 of device 102. External sensor(s) 314 may be similar or identical in specification to the previously described external sensor(s) 214 of device 102. In general, any of the sensor architectures discussed above with respect to device 102 may be used. As such, the inertial sensor 312 and/or external sensor 314 of auxiliary device 106 may be one or more motion sensors, may be internal or external and may be analog or digital components. In an example embodiment, SPU 306, communications module 326 and external sensor 314 may be coupled by bus 320, although any suitable architecture may be employed.

A link between the communications modules (226 and 326) of mobile device 102 and auxiliary device 106 may be used to transfer measurements of atmospheric pressure obtained by pressure sensor 108 as reference pressure information for correction of pressure sensor 104 by correction module 224 as described above. Additionally, pressure information obtained by pressure sensor 104 may be sent to auxiliary device 106 and/or information pertaining to one or more condition characteristics may be exchanged between mobile device 102 and auxiliary device 106. Such communications may employ any desired wired or wireless protocol as described above. Although FIG. 2 and FIG. 3 depict correction module 224 as being implemented in device 102, any or all the functions of correction module 224 may be performed using corresponding processing and memory resources in auxiliary device 106, such as by sensor processor 308 and memory 310.

Figure 4:
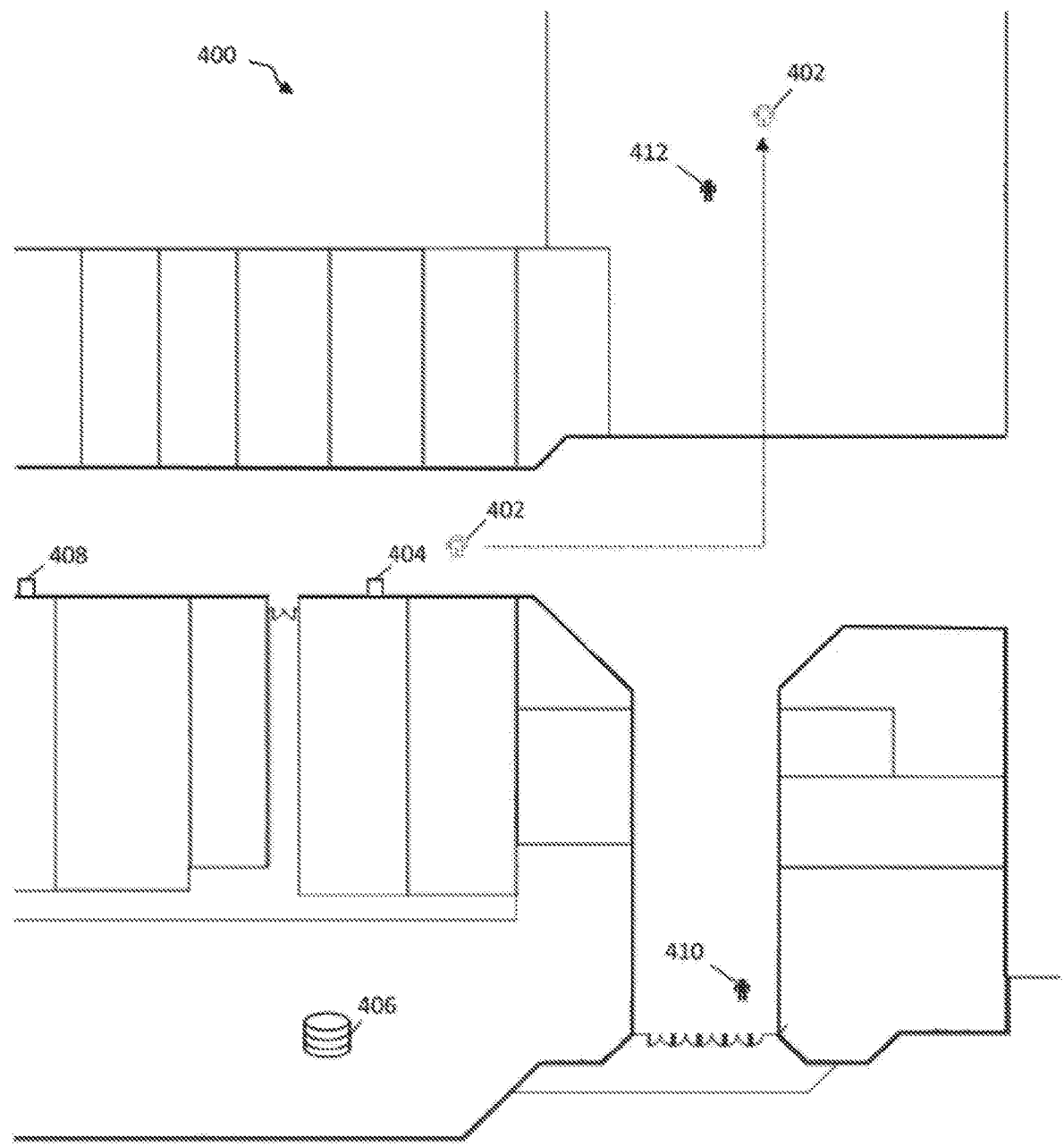
FIG. 4 is a schematic diagram showing example conditions for correcting a pressure sensor associated with a mobile device according to an embodiment.

Examples of pressure sensor correction, such as may be performed by mobile device 102 and auxiliary device 106, are depicted with reference to a schematic map of an indoor shopping mall 400 is depicted in FIG. 4. User 402 may have a mobile device configured to correct a pressure sensor using external reference pressure information according to the techniques of this disclosure. In one aspect, user 402 may be within a suitable threshold distance of a fixed, external pressure sensor 404. Upon determination of proximity to external pressure sensor 104, the mobile device of user 402 may receive corresponding reference pressure information and perform a correction process. As described above, communication may occur directly between the mobile device of user 402 and the external sensor, or may be mediated through a remote server 406. Although depicted as being within shopping mall 400, the location of server 406 is not limited.

In another aspect, device 102 may not be sufficiently proximate to any one source of reference pressure information. Accordingly, the mobile device of user 402 may receive reference pressure information from multiple sources, such as external pressure sensor 408 and a mobile device associated with user 410. Any suitable number of sources may be employed. As noted above, the mobile device of user 402 may be configured to weight the reference pressure information received from multiple source based on criteria such as proximity or reliability when performing the correction operation.

In yet another aspect, user 402 may travel to a different location as indicated. When the pressure sensor of user 402's mobile device is considered to be sufficiently corrected, it may provide reference pressure information for use by another device. As shown, user 412 may have a mobile device that receives reference pressure information from the mobile device of user 402 to perform a correction operation. The reference pressure information may be communicated directly between devices or may be delivered over a network, such as by server 406.

Figure 5:
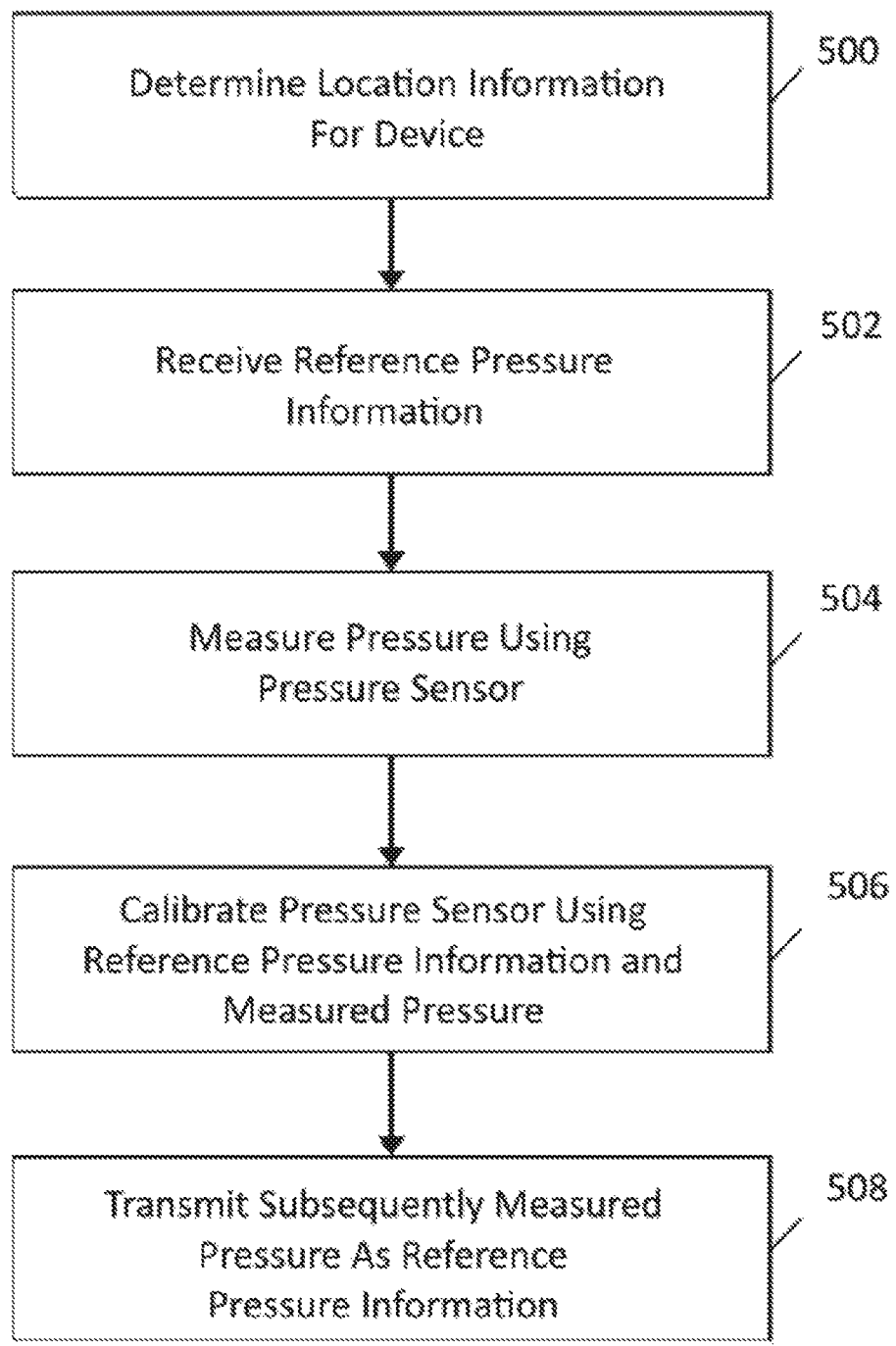
FIG. 5 is flowchart showing a routine for correcting a pressure sensor associated with a mobile device according to an embodiment.

To help illustrate aspects of this disclosure, FIG. 5 depicts a flowchart showing a process for correcting a pressure sensor associated with a mobile device. Beginning with 500, a position of device 102 may be determined, such as by using location module 228. In 502, reference pressure information may be received from auxiliary device 106, as well as any number of suitable external sources, including a server, another mobile device or a fixed sensor installation. Pressure may then be measured at device 102 using pressure sensor 104 in 504. Then, in 506, correction module 224 may correct pressure sensor 104 using the measured pressure and the reference pressure information. At 508, as desired, device 102 may transmit a subsequently measured pressure as reference pressure information, to be used in a correction process performed by a different device.

As discussed above, mobile devices may be equipped with different sensors in order to determine its position and orientation in space. For example, inertial sensors or motion sensors such as accelerometers, gyroscopes, and magnetometers may be used. The accelerometers may provide information about the orientation of the device with respect to gravity, and magnetometers may provide information about the orientation with respect to the earth's magnetic fields. Gyroscopes measure angular velocities and may be used to determine changes in orientation with respect to a known orientation, which may be based on the accelerometer and magnetometer data. Accelerometer data may be used through double integration to determine a position change of the mobile device. In addition to the motion sensors, pressure sensor may be used to determine elevation of the mobile device. Sensor data from different sensors may be combined in a sensor fusion process in order to determine the position and/or orientation of the mobile device in space.

For some mobile devices, a correct determination of the device's elevation may be important. For example, for drones the altitude may be determined using some of the above mentioned sensors, including pressure sensor 104 for example, and may be used for features such as automatic landing or takeoff, or hovering at a fixed height. For other devices such as an HMD or smartphone used in AR/VR applications, the height information may also be required in order to follow changes in (vertical) position in the virtual world. When the elevation is determined using a pressure sensor, any other factors changing the pressure except the height or elevation may influence the correct altitude determination. In other words, any change of pressure not due to an elevation change, may be incorrectly assumed to be due to elevation. This will lead to an incorrect determination of altitude. For drones, this incorrect determination may be manifest as an inability to maintain stable elevation. The techniques of this disclosure may be employed in these and other applications. Correspondingly, corrections to pressure sensor data may be used when determining motion of mobile device 102, particularly in a vertical direction or when determining height or elevation. As such, determining vertical motion, as used herein, means establishing a position for mobile device 102 including height or elevation, and/or characterizing a change in height or elevation, including determining that substantially no change has occurred in elevation. Correcting the pressure sensor data may comprise any type of correction or calibration to make sure that the corrected pressure data can be reliably used to determine (vertical) motion.

Figure 6:
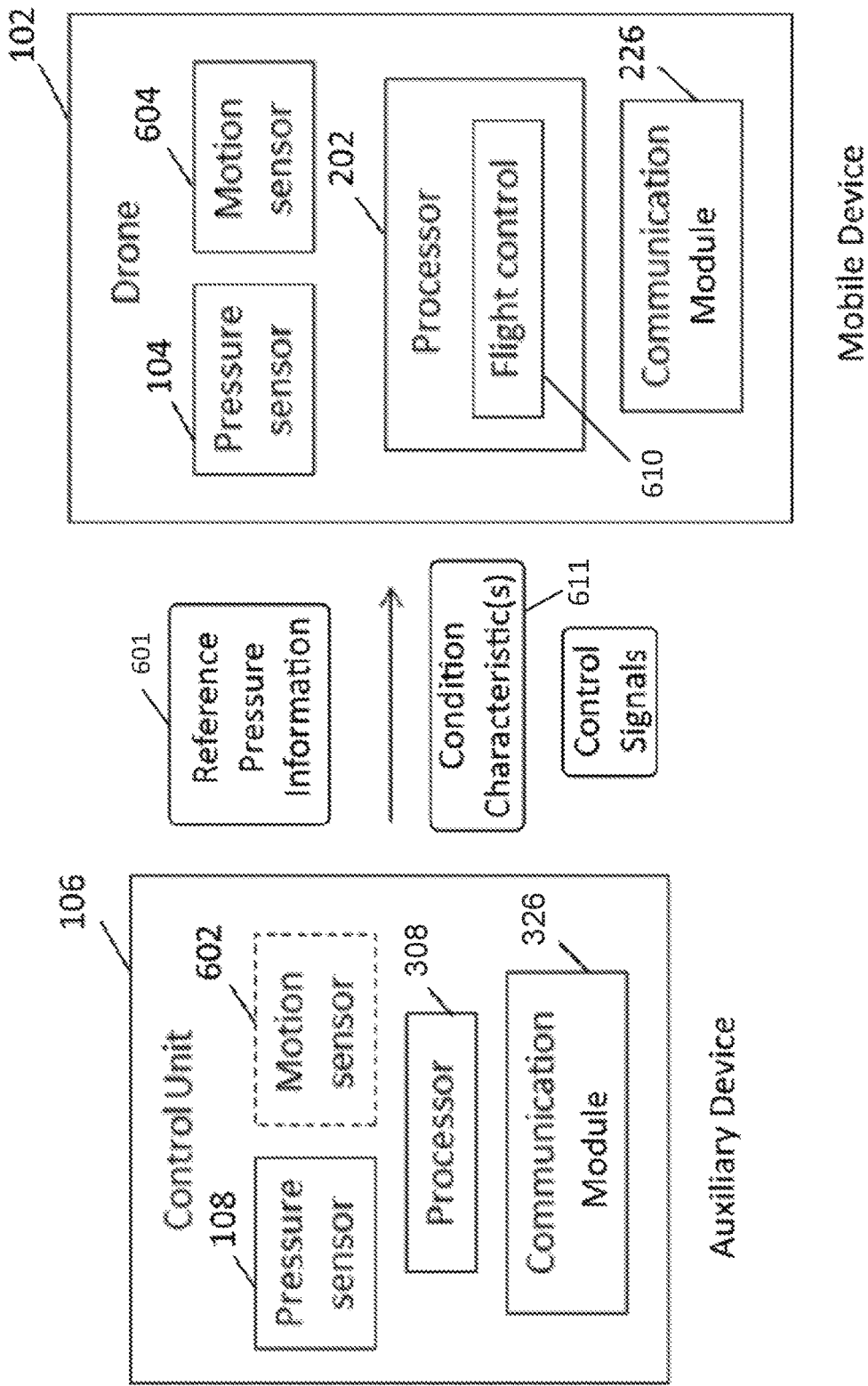
FIG. 6 is schematic diagram of a pressure sensor correction system having two devices according to an embodiment.

As discussed above, mobile devices may have additional devices associated with them. For example, a drone may have a control unit as an auxiliary device or associated additional device. This control unit is employed by the user to send commands that govern the motion of the drone. The control unit may be a dedicated/associated additional device or may be e.g., a smartphone phone with an application to control the drone. FIG. 6 shows a schematic representation of an embodiment in which mobile device 102 is implemented as a drone and auxiliary device 106 is implemented as an associated control unit, depicting the flow of information between the devices. In this context, auxiliary device 106 may be used to send control signals to mobile device 102 as shown. The devices may include functional components as described above regarding FIG. 2 and FIG. 3. For example, motion sensor 602 of auxiliary device 106, if provided, may be any combination of inertial sensor 312, external sensor 314 or other suitable sensor architectures, while motion sensor 604 of mobile device 102 may likewise be any combination of inertial sensor 212, external sensor 214 and/or auxiliary sensor 216. To pilot the drone, host processor 202 may implement a suitable flight control module. In this example, the drone (mobile device 102) has pressure sensor 104, and the control unit (auxiliary device 106) is equipped with pressure sensor 108, the pressure data from the control unit may be used as reference pressure information 601 to correct, if needed, the pressure data from the drone. Thus, FIG. 6 indicates that auxiliary device 106 may communicate reference pressure information 601 to mobile device 102, as well as any determined condition characteristics 611. Further, the flow of information, including reference pressure information 601 and condition characteristics 611, is depicted as being transmitted from auxiliary device 106 to mobile device 102 corresponding to correction module 224 being implemented in mobile device 102. However, as noted above, other architectures may be employed that implement the functionality of correction module 224 in auxiliary device 106 or divide the functionality among multiple devices. As such, different flows of information may be appropriate, for example, mobile device 102 may transmit measurements from pressure sensor 104 to auxiliary device 106, optionally along with one or more determined condition characteristics 611, so that correction calculations may be performed at auxiliary device 106 and the appropriate corrections or adjustments returned to mobile device 102. In general, one or more context or condition characteristics 611 may either be sent from auxiliary device 106 to mobile device 102, from mobile device 102 to auxiliary device 106, or both.

In this example, the pressure sensor in the drone may be corrected using the pressure sensor in the control unit. One of ordinary skill in the art will appreciate that correction may refer to any adjustment or calibration of measurements recorded by pressure sensor 104 being made to compensate for changes in pressure other than caused by elevation changes. In other words, the sensor readings, such as data from pressure sensor 108 of auxiliary device 106, may be used as reference pressure information 601 for mobile device 102. If the pressure as measured by the control unit (auxiliary device 106) has changed due to external influences, and it may be assumed that the drone has been exposed to the same external influences, then the pressure change as measured by the control unit due to external influences may be used to correct the pressure change of the drone (mobile device 102) such that any remaining pressure change determined by pressure sensor 104 is only due to elevation changes of the drone. In one embodiment, the correction of the pressure sensor data from the mobile device may comprise subtracting the reference pressure from the pressure sensor data of the mobile device. The subtracting may be weighted, meaning that a weight, or multiplication factor, is applied to the reference pressure before performing the subtracting. In this case, it may be assumed that the elevation change of the control unit may be neglected (compared to the elevation change of the drone), although dedicated sensor integrated with auxiliary device 106 may be able to detect whether sufficient change has occurred, and to adjust the compensation for correction of pressure sensor 104 accordingly. One or more condition characteristics 611 may be used as tests or otherwise to determine, if, and to what extent, the reference pressure information 601 from auxiliary device 106 may be applied to correct or otherwise calibrate the pressure measurement at mobile device 102. The condition characteristics 611 may be used to determine the weight of the reference pressure in the correction. Based on these characteristics, a confidence factor may be determined evaluating the reliability for a given application of the pressure measure by auxiliary device 106 when correcting mobile device 102. The confidence factor may be compared to a threshold, and if the confidence is greater than the threshold the correction may be performed.

As discussed above, a condition characteristic may be considered anything having a known or estimated impact on the pressure being measured, such as by pressure sensor 104 and/or pressure sensor 108. A condition characteristic may refer to the environment, the usage, or context of the mobile device or additional/auxiliary device. Another suitable class of such characteristics is one that relates to conditions affecting auxiliary device 106 rather than mobile device 102. In one aspect, a motion criteria or motion test may be applied to the auxiliary device as warranted by a condition characteristic. For example, in the context of the drone and controller context, motion (particularly in the vertical direction) of the control unit may be monitored, such as by using motion sensors 602, to influence how the reference pressure information 601 provided by auxiliary device 106 is used when correcting pressure sensor 104 of mobile device 102. To illustrate, a motion threshold may be set, and if the motion of the control unit is above this threshold, the pressure data from the control unit is not used. Alternatively, if the motion is above the threshold and vertical displacement may be estimated, the reference pressure information 601 may be adjusted by an appropriate amount in relation to the estimated vertical displacement of auxiliary device 106. This motion threshold may be e.g., a speed threshold or a displacement threshold, and these thresholds may be absolute thresholds, or may be relative thresholds compared to the motion of mobile device 102, or any other characteristic used to evaluate the current correction state of pressure sensor 104. In another example, the influence of the reference pressure information 601 may be weighted or otherwise adjusted based on the determined motion of auxiliary device 106. For example, the weight of the reference pressure information 601 may be decreased in relation to the amount of determined (relative) motion of the control unit.

It may also be determined to what extent the mobile device and the auxiliary device are exposed to the same external influences. In one aspect a proximity criteria or proximity test may be applied to auxiliary device 106 and mobile device 102 as another class of condition characteristic. For example, in the context of the above embodiment, if the drone is very far away from the controller, the drone may not experience the same external influences as the control device. In a similar fashion as with the motion criteria, a proximity threshold may be used, or the reference pressure weight may be adapted based on the result of the proximity test. The proximity, or distance between the auxiliary device and the mobile device may be determined using various techniques and sensor, such as for example, motion or location sensors, proximity sensors, or based on radio communication methods (e.g., time of flight, or signal strength). Image or audio sensors, implemented by external sensors 214 and/or 314 for example, may also be used to determine the proximity. As an illustration, if mobile device 102 is a drone, auxiliary device 106 may have a microphone and, by filtering and tuning the audio to the rotor frequencies, proximity may be estimated in relation to the amplitude of the audio signal determined to correspond to the drone's rotors.

In the examples above, the influence of various condition characteristics 611 has been addressed in isolation. However, it will be appreciated that the information represented by the condition characteristics 611 may be combined when adapting the correction of pressure sensor 104. As one illustration, the above discussion regarding proximity may have more relevance in an outdoor location as compared to an indoor location. Thus, by determining a location condition characteristic that indicates an outdoor environment rather than an indoor environment, more emphasis may be placed on the influence or effect of the proximity condition characteristic as compared to situations in which an indoor environment condition characteristic has been determined. Since indoor environments are typically more controlled, a different exposure to external influences may be less likely. Therefore, correction of pressure sensor 104 may be adaptive to the type of environment such as e.g., indoor or outdoor, either alone or in combination with adjustments related to other condition characteristics 611. Further, any aspect of the correction may be set by the user, or may be preset depending on the intended use of the device. Correspondingly, the type of correction performed by be automatically adapted to the detected environmental condition characteristic. One or more of the condition characteristics 611 may be based on the associated sensors of auxiliary device 106 and/or mobile device 102, including without limitation image sensors, audio sensors, location sensor, and the like.

Figure 7:
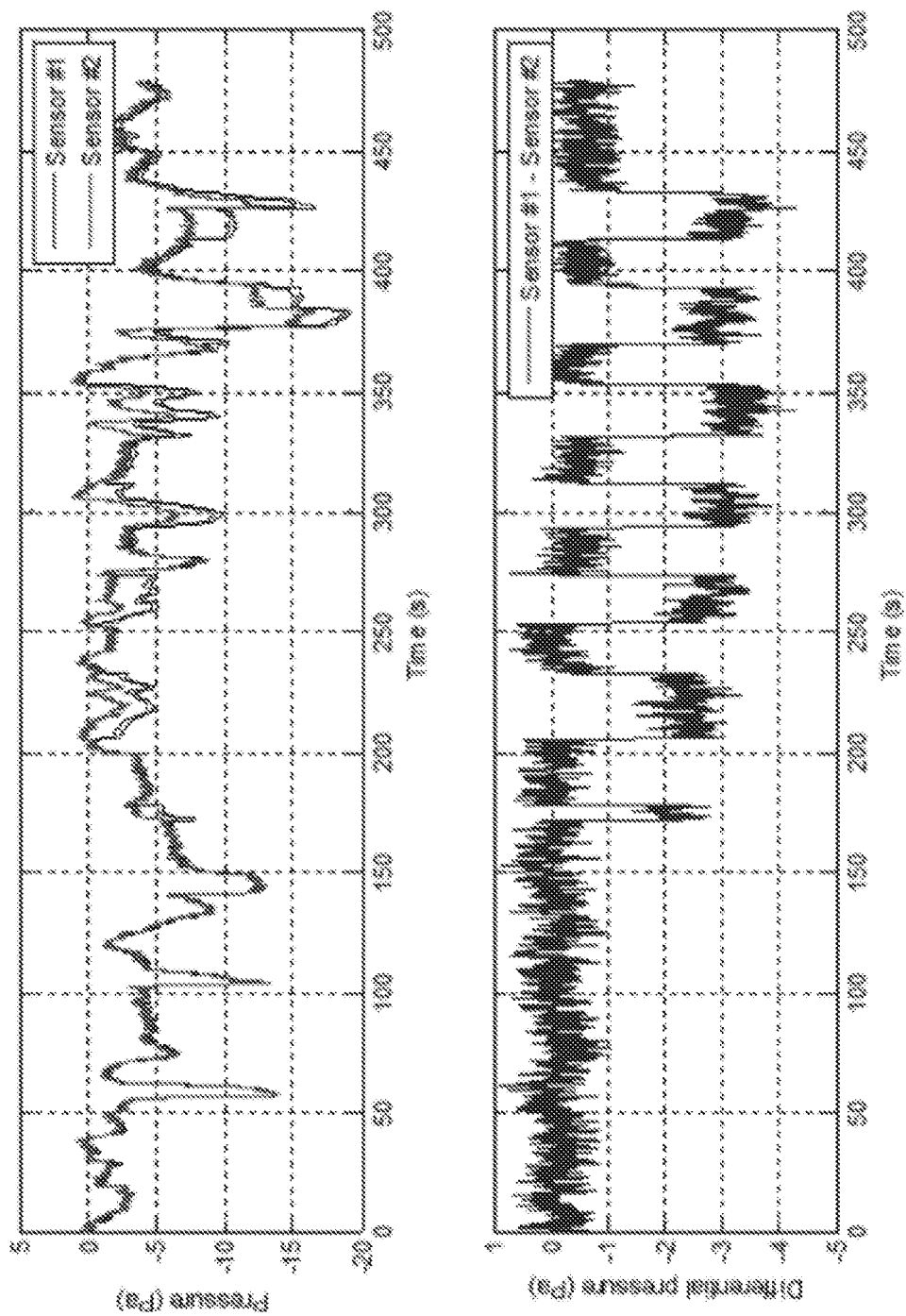
FIG. 7 is schematic representation of corrected indoor pressure sensor according to an embodiment.
Figure 8:
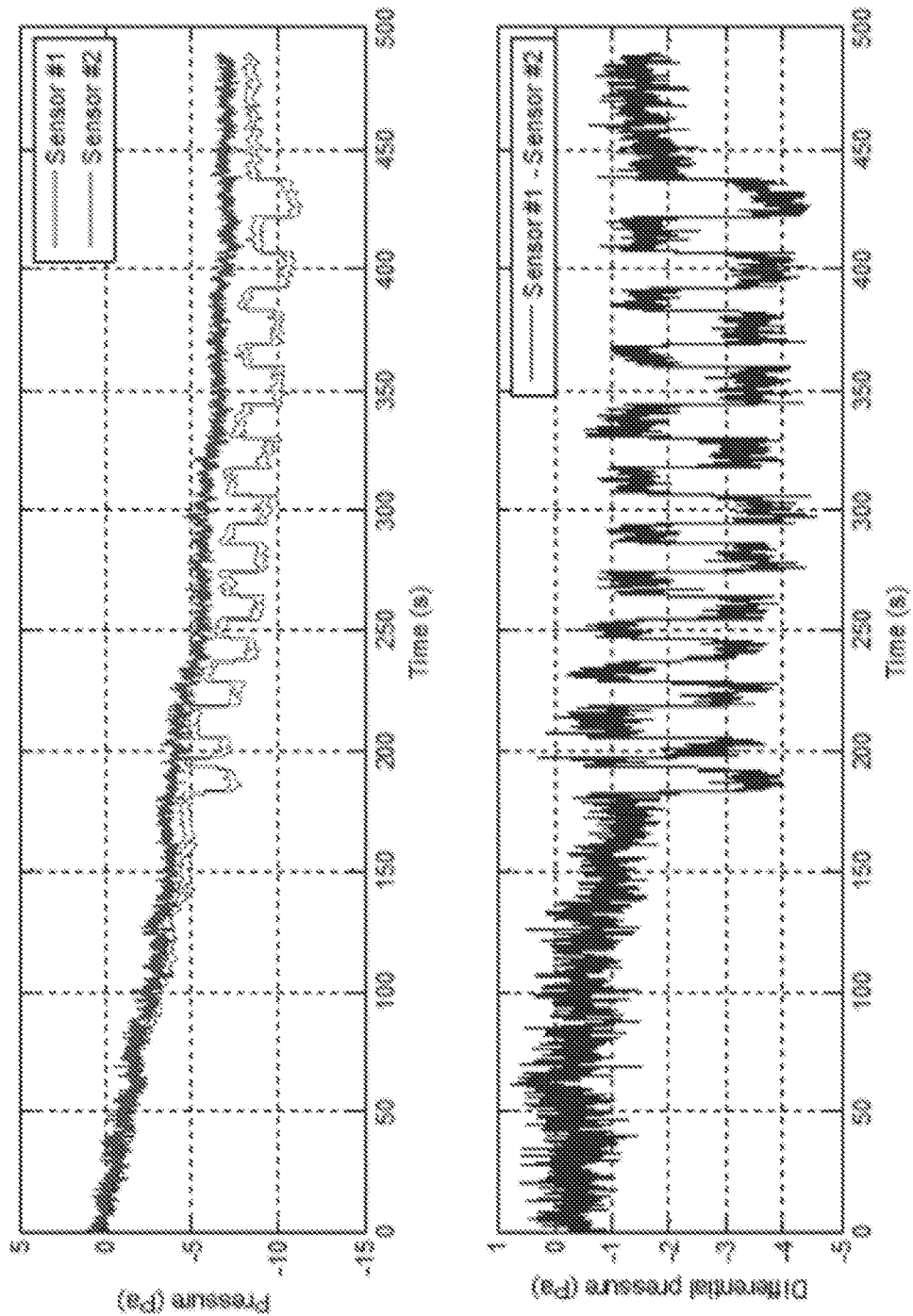
FIG. 8 is schematic diagram of a corrected outdoor pressure sensor according to an embodiment.

To help illustrate the impact of a condition characteristic on the manner in which correction of pressure sensor 104 is performed, FIG. 7 and FIG. 8 show example measurements of pressure changes for an indoor environment and an outdoor environment, respectively. The top panes of each figure show the pressure of the drone (sensor 1), representative of mobile device 102 and pressure sensor 104, and the control unit (sensor 2), representative of auxiliary device 106 and pressure sensor 108. As discussed above, pressure measurement for the drone graph and sensor 1 should represent pressure changes due to height changes, subject to any condition characteristic that may influence such measurements. The variation in the pressure in the top pane of FIG. 7 reflects pressure change due to air conditioning system switching on and off, and the closing and opening of doors. Correspondingly, the bottom panes show the corrected pressure, where reference pressure information from the control unit (sensor 2) is used to correct the pressure data from the drone (sensor 1). This corrected pressure at mobile device 102, as corrected for external influences by the differential pressure sensing performed at auxiliary device 106, may then be used to determine the altitude of the drone.

Figure 9:
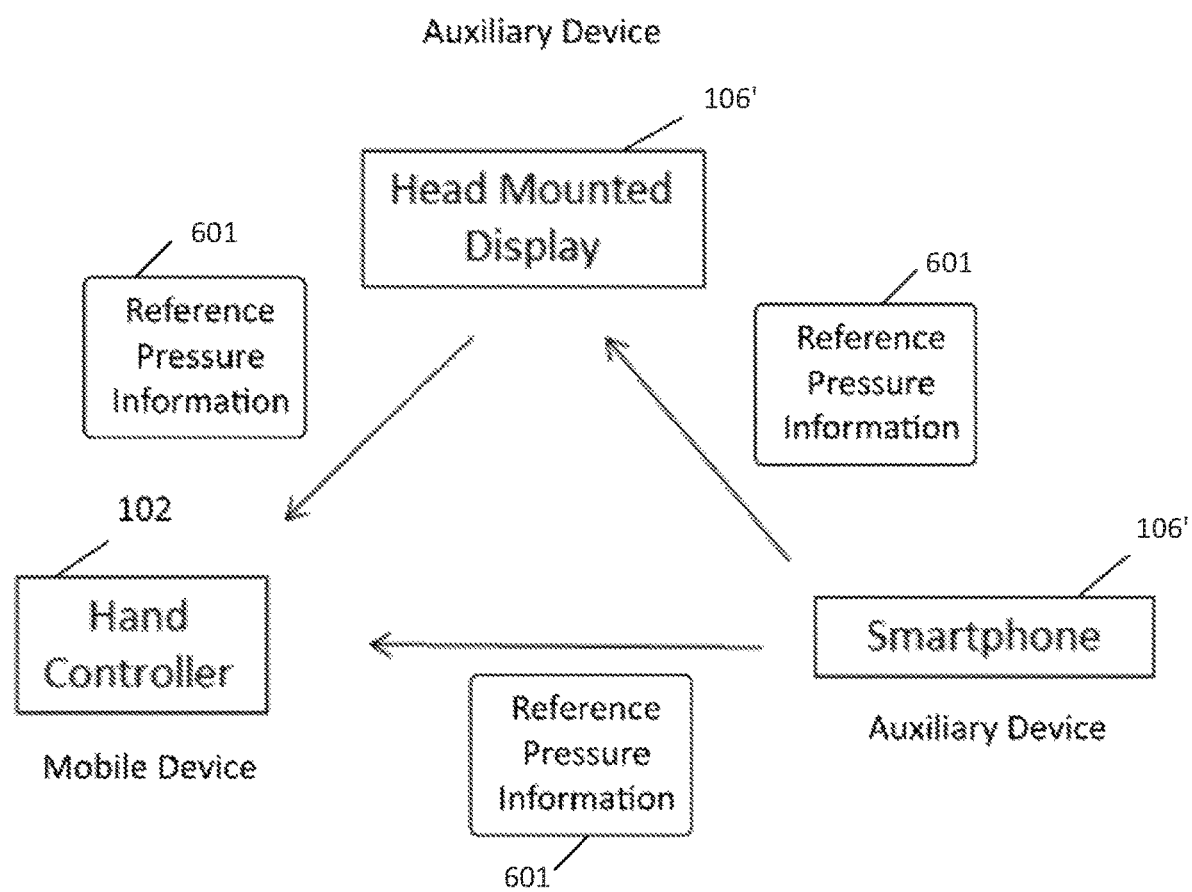
FIG. 9 is a schematic diagram of a pressure sensor correction system having three devices according to an embodiment.

The embodiments above have described the techniques of this disclosure primarily in the context of two devices, mobile device 102 and auxiliary device 106. However, it will be appreciated that similar techniques may be employed with multiple auxiliary devices. To help illustrate, one embodiment involves a VR system with a HMD, a Hand Controller (HC) and a smartphone as schematically depicted in FIG. 9. As indicated, the HC may be mobile device 102, while the HMD and the smartphone may alternatively be auxiliary device 106 and auxiliary device 106'. The user of the VR system wears the HMD on his or her head, and holds the HC in his or her hand. The HC may be used to control the game or other VR application and may be used in addition to represent an object in the virtual world. Further, the user may be in the possession of a smartphone, where in possession means that the user is carrying the smartphone on the user, or has placed the smartphone in the vicinity of the user, such that the smartphone is associated with the system and may be a source of reference pressure information, such as reference pressure information 601. However, such an auxiliary device need not be otherwise involved in other operations of the VR system.

With regard to this embodiment, either or both of auxiliary device 106 and auxiliary device 106' may be used for reference pressure information, such as reference pressure information 601. Moreover, one of the auxiliary device may provide reference pressure information for the other auxiliary device. In the context of the above illustration, if auxiliary device 106' provides a source of reference pressure information and is otherwise not employed by the VR application, it may be considered to be relatively stationary and any measured pressure changes may indicate a global condition affecting all of the devices. This assumption may be validated or confirmed by any suitable technique, including using any motion sensor data available for auxiliary device 106'. For example, condition characteristics determined for each device may be compared. When sufficient confidence exists that changes in atmospheric pressure for one device also affect one or more other devices, reference pressure information for one auxiliary device 106 may be used to help correct either or both of another auxiliary device 106' and mobile device 102.

Alternatively or in addition, reference pressure information from multiple auxiliary devices, such as auxiliary device 106 and auxiliary device 106' may be combined, subject to any warranted weighting, and used when correcting mobile device 102. Similar condition characteristic(s) may be applied as desired. In this context, one or more condition characteristics may be used in a condition test to be performed for any auxiliary device contributing to the reference pressure information. For example, if the condition of the smartphone is such that it is immobile, or close to immobile, the pressure sensor of the smartphone may be used to provide a reference pressure for the HMD and/or HC. The inertial sensors in the smartphone may detect the absence of motion, e.g., because the device is lying on a table, and may provide the pressure sensor readings as a reference. This reference pressure may then be transmitted to the HMD and the HC for correction of pressure changes not due to height changes. If the processing of the HC data is done by the HMD, the smartphone may not need to send the pressure data to the HC since the pressure data sent to the HMD may also be used as a reference for the HC. As in the example above, condition characteristics affecting each of the devices may be compared to determine if the smartphone is likely to be exposed to the same external influences as the HMD and/or HC. Tests involving these condition characteristics may be performed using position/location information, or wireless signal exchange of strengths, in order to determine a distance between the devices.

As will be appreciated, the above example involves an application in which the HC may experience more changes in altitude than the smartphone or HMD. However, in other usage contexts, another component may be expected to be subject to more significant changes in elevation. In such applications, the device undergoing more changes in altitude may be considered mobile device 102, while any other associated auxiliary devices 106/106' may be used as potential sources of reference pressure information, as well as being used to determine one or more condition characteristics. Moreover, the role associated with auxiliary device 106, i.e., providing reference pressure information, may be dynamically reassigned among the devices in the system depending on which is currently more stable or less influenced by external factors.

In this example, the HMD may be considered as acting in the role of mobile device 102 when correcting its pressure sensor using reference pressure information from the smartphone as indicated in FIG. 9. Further, the HMD may also act in the role of auxiliary device 106' by providing reference pressure information to the HC. In this example system, the HC in the hand is more likely to be moved more than the HMD on the head, and thus the HC may be expected to undergo more elevation changes. The HMD may be moved a lot, but in typically this involves orientation changes or lateral motion, and not up and down motion that leads to height changes. Therefore, pressure data from the HMD may also be used as a reference pressure information for the HC. The inertial sensors of the HMD may be used to determine if the user is not moving the head too much (in a vertical direction) as one suitable condition characteristic. A motion threshold may be used to determine if the pressure data from the HMD may be used. This motion may be in a certain direction or along a certain vector, or may be limited in dimensions, for example, only considering the vertical direction. As mentioned in the example of the drone, the motion may also be used to give a weight or other influence to the pressure data of the HMD when correcting the pressure in the HC.

Figure 10:
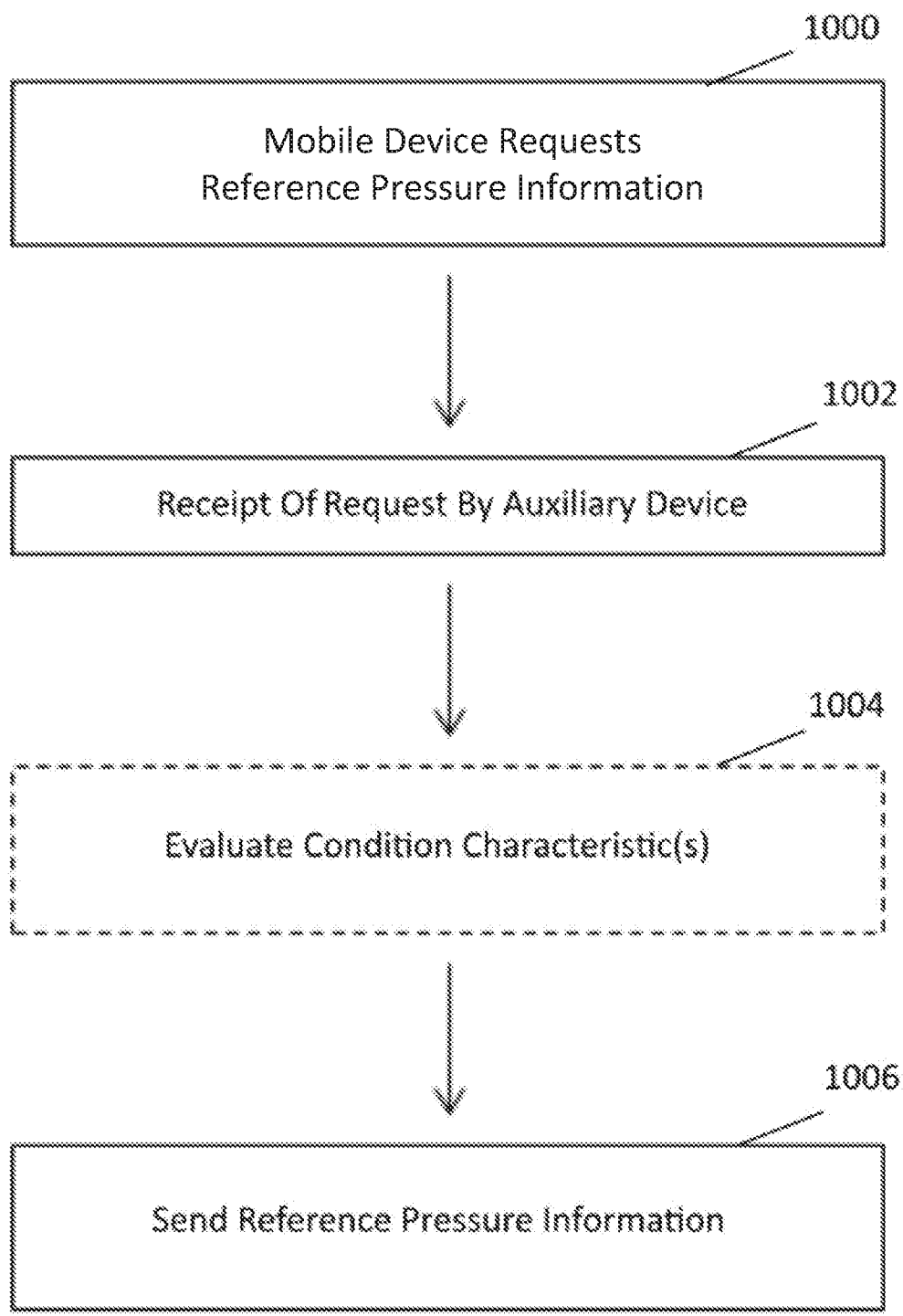
FIG. 10 is flowchart showing a routine for correcting a pressure sensor for mobile device using reference pressure information from an auxiliary device according to an embodiment.

To help illustrate aspects of this disclosure, FIG. 10 schematically depicts a sequence of operations that may be performed when performing differential pressure sensing to calibrate or correct the pressure sensor of one or more devices. Mobile device 102 may determine that reference pressure information may provide a more accurate altitude determination, such as by evaluating one or more condition characteristics to determine whether the reference pressure information may be used to correct the measurements of pressure sensor 104. Correspondingly, mobile device 102 may send a request for reference pressure information in 1000. This request may be a onetime occurrence, may be based on determined need or may be periodic as desired. Further, the request may be a direct communication with an auxiliary device 106, where an association has already been defined with mobile device 102. Alternatively, the request may be in the form of a wider broadcast or multicast, to any device in proximity having capability to provide pressure reference information. The request may also specify a certain required accuracy or other quality criteria. After auxiliary device 106 has received the request in 1002, one or more condition characteristics may be evaluated in 1004. As indicated, this is optional and may involve condition characteristics affecting either or both of mobile device 102 and auxiliary device 106. In 1006, auxiliary device 106 may then send the requested reference pressure information directly to mobile device 102. In other embodiments, the decision of whether and when to transmit reference pressure information may be determined by auxiliary device 106. As such, auxiliary device 106 may periodically transmit reference pressure information, optionally along with any determined condition characteristics. Alternatively, auxiliary device 106 may transmit reference pressure information after evaluating one or more determined condition characteristics to establish a desired validity of the reference pressure information.

As discussed above, a condition characteristic may be evaluated as a test to determine the suitability of available reference pressure information at a given time. Thus, the decision of whether to send the reference pressure information in 1006 may be predicated on the outcome of the test. Any suitable condition characteristic or combination of characteristics may be used in the evaluation, including the usage, environmental, proximity, motion and other characteristics discussed above. In this embodiment, the transmission of reference pressure information may be based on the evaluation. However, in other embodiments, the reference pressure information may be sent regardless, along with any determined condition characteristics, and the evaluation may be performed by mobile device 102 to determine whether to apply a correction involving the reference pressure information. As discussed, the decision of whether to apply a correction may include weighting the reference pressure information, such as by adjusting for confidence in the accuracy of the information. Still further, auxiliary device 106 may either send a determined condition characteristic to mobile device 102, or may send sensor or other information to mobile device 102 for determination of the condition characteristic. For example, when receiving the request, auxiliary device 106 may send reference pressure information and motion sensor data, so that mobile device 102 may determine a motion condition characteristic for auxiliary device 106 when deciding whether to correct or what the weight to give the reference pressure information. Again, mobile device 102 may receive reference pressure information from a plurality of auxiliary devices, and may then select which reference pressure information to employ based on any determined condition characteristics. Likewise, reference pressure information from multiple sources may also be combined, with relative weighting as appropriate for any determined condition characteristics. One or more additional device may be selected from among a plurality of mobile devices to supply a reference pressure, and the selection may be based on the condition characteristic. For example, the condition characteristic may be a motion characteristic, and the selecting may comprise comparing the motion characteristics and selecting one or more mobile devices with a certain motion characteristic, e.g., motion at or below a certain motion threshold.

As mentioned above, pressure sensor data and the inertial or other motion sensor data may be used to determine the altitude of mobile device 102. Both types of sensors have problems or problem conditions that may influence the accuracy of the height calculations. For the pressure sensor, there are the influences of external factors as explained above, and to correct for this, reference pressure information may be used so that height estimation is based on differential pressure measurements. Height (or height change) estimated from sensors other than a pressure sensor may also have problems due to drift and/or offsets of the sensors. For example, when accelerometers are used, any offset or drift may lead to an error in the determined altitude, due to the fact that a double integration is required for positional determinations.

To help mitigate problems or inaccuracies associated with individual sensors, a sensor fusion combining the differential pressure measurements and the motion data may be used. The principle of the fusion is to combine the pressure and motion data in such a manner that the best combination is selected, and may be based on any determined condition characteristics following the techniques described above. In other words, the contribution or weight of the pressure and motion data may be varied and adapted. As a further illustration, when using accelerometers to determine the acceleration of mobile device 102, the acceleration due to gravity has to be removed from the accelerometer readings. The estimation of the gravity vector and the conversion between reference frames may also lead to uncertainties or errors, which, when doubly integrated, may lead to an error in the determined altitude. Thus, in a situation where there is a long period of motion, the weight of the motion data may be reduced because any potential accelerometer offset may lead to errors due to the extended integration period. Similarly, when the motion is to quick, leading to large acceleration, the weight of the motion data may also be reduced. This also means that in the opposite conditions with short periods of motion and/or low motion speeds/amplitudes, the accelerometer data may have an increased weight in the altitude determination In a similar manner, the weight attributed to the differential pressure measurements may also be adjusted. For example, if auxiliary device 106 is subject to condition characteristics indicating there are many and/or large pressure changes due to external influences, the weight of the differential pressure measurements may be reduced. Even though the reference pressure information is used, errors in the calculation may still occur. Likewise, if the system determines as a proximity condition characteristic that there is a larger distance between mobile device 102 and auxiliary device 106 such that both devices may experience different external influences, the weight of the differential pressure measurements may also be reduced.

The fusion of the pressure data and the motion data may be referred to as 7-axis fusion, where the motion data represents 6-axes or degrees of freedom, and the pressure sensor provides the $7^{th}$ axis or degree. The 6-axis may refer to the use of a 3-axes accelerometer and a 3-axes gyroscope, and the fusion of the accelerometer and gyroscope is often referred to as 6-axes fusion. In another embodiment, a 10-axis fusion may involve accelerometer, gyroscope, magnetometer and pressure sensor data. The fusion may be performed using any suitable technique. For example, altitude may be determined individually for the motion data and the differential pressure measurements, and then both values may be combined, where the weights of each contribution are varied depending on the conditions as described above.

Figure 11:
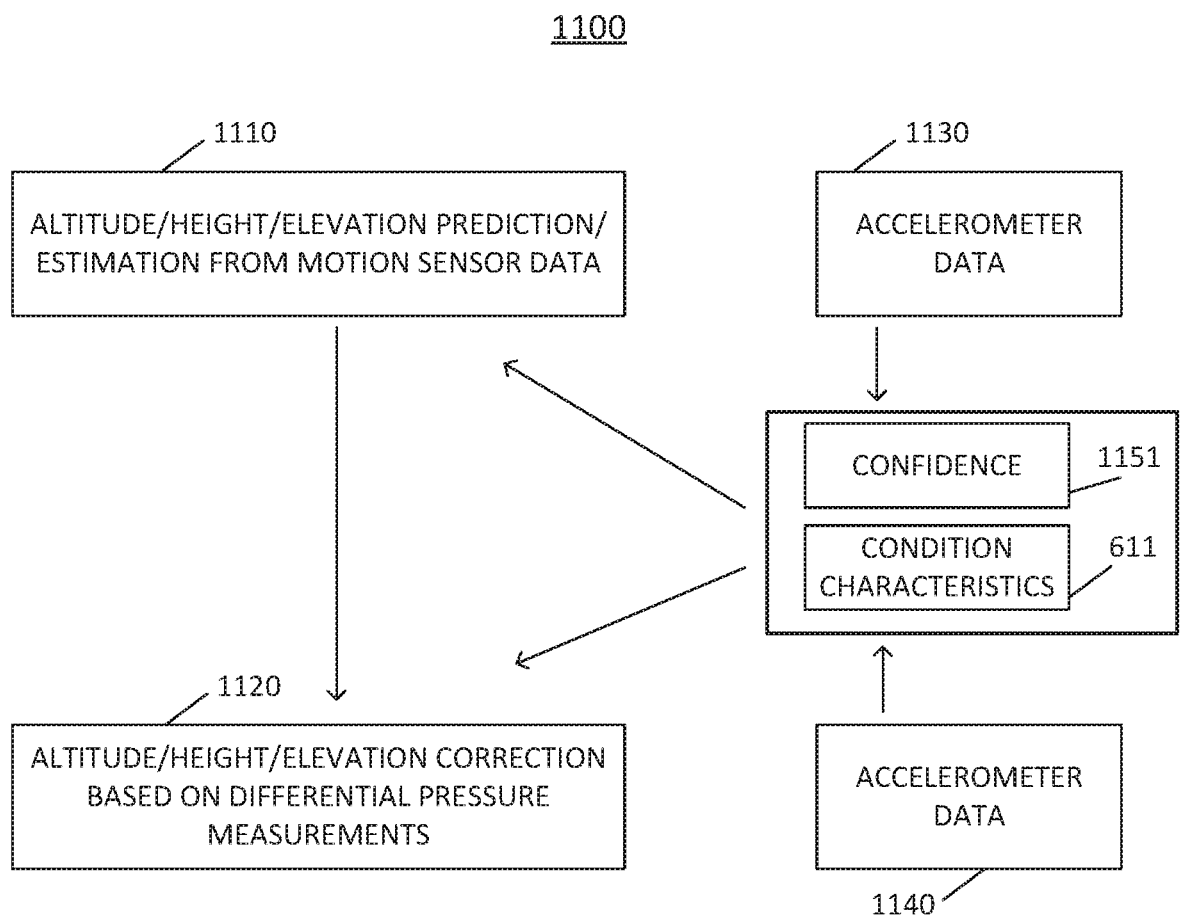
FIG. 11 is schematic diagram of a Kalman filter for fusing pressure sensor data according to an embodiment

Alternatively, a form of a Kalman filter may be used to perform the fusion, where the weights of the motion and pressure data in the prediction and the correction are adapted. One example of a suitable Kalman filter system 1100 is schematically shown in FIG. 11. As depicted, altitude prediction 1110 for mobile device 102 may be based on motion sensor data, such as the determined linear acceleration (e.g., accelerometer data 1130 and/or 1140), and may be influenced by confidence 1151 in the determination. If this confidence is high, the covariance of the prediction may only be increased slightly, while if this confidence is low, the covariance of the prediction may increase more significantly. The correction 1120 of the altitude estimation may then be performed as discussed above, using differential pressure measurement to correct pressure sensor 104 of mobile device 102. Because the accelerometer data 1130/1140 may be obtained at a relatively high sample rate (e.g., 1 kHz), as compared to the sample rate of pressure data (e.g., 40 Hz), the prediction 1110 will run at a faster rate than the correction 1120. The correction 1120 based on the pressure data may be adapted based on the confidence 1151 in the pressure data or based on the condition characteristics 611 associated with the pressure data. If the pressure does not change much and/or a correct reference pressure is used in a differential pressure system, then the gain of the applied correction 1120 may be large. If large and/or fast pressure variations are observed, and/or a reference pressure with some uncertainty is used, the gain of the applied correction 1120 may be smaller. In other words, the prediction 1110 and the correction 1120 may be adapted based on confidence in the motion sensor data as well as any determined condition characteristic.

The combination of the motion data and the pressure data may also be used to learn about the correct application of the reference pressure information, and under which condition characteristics it may be applied. For example, when there is high confidence 1151 in the motion data, but the altitude or elevation as determined using the pressure data is different from the altitude determined based on the motion data, this may indicate that the reference pressure may not have been correctly determined. Correspondingly, correction 1120 may not be applied, or may be applied with a different weight. Thus, based on this comparison, the system may learn the conditions and approximate weights of the application of the reference pressure depending on determined condition characteristics 611.

In embodiments where the reference pressure information is used to correct or correct pressure sensor 104 of mobile device 102, factors may also influence the pressure sensor data of the mobile device. For example, usage condition characteristics 611 were discussed above. In applications for drones or similar devices, rotor speed may create local pressure effects which may be corrected for in order to correctly determine the altitude of mobile device 102. Therefore, a correction for the local pressure effect may be performed in addition to any correction based on differential pressure measurement. The local pressure effect due to the rotors may be investigated and calibrated during the design phase of the drone. The placement of the pressure sensors may also be adapted to minimize the local pressure effects and decrease pressure noise, for example, by selecting to mount the pressure sensor on top or below the drone body. Further, a correlation between rotor speed and the pressure measured by pressure sensor 104 may be established and used to more accurately estimate height. When these investigations are done in the design phase, the results may be stored in a memory on the device, for example as lookup tables, and the correction 1120 for the local pressure effect may be performed depending on the associated condition characteristics 611. The local pressure effect due to the rotors may also be influenced by the elevation of the drone or the proximity to the ground. When the drone is close to the ground, the presence of the ground creates a ground effect, which may be estimated as an addition to the rotor effect or a modification to the rotor effect as desired. This ground effect decreases as the drone gains elevation and is farther from the ground, and the compensation may be adapted accordingly. Condition characteristics 611 related to the ground effect or the rotor effect may also be determined using the motion sensor, and optionally, may be influenced by confidence in the motion data. For example, when the drone is stable on the ground and then takes off, increasing its elevation, the motion data may be considered more accurate given that the motion sensors may be calibrated when the drone is stable on the ground. As the drone increases elevation, the height may be determined based on the motion data, and then compared to the height estimated from the corrected pressure data. When the height increases, it may be expected that the ground effect decreases, while the rotor effect may stay approximately constant. As such, the total effect of the combined ground effect and the rotor effect, will approach the rotor effect only as the height increases. Therefore, by using the motion data, the influence of the ground effect and the rotor effect on the pressure measurements may be characterized, and a correction 1120 for these local pressure effects may be determined.

The application of the differential pressure measurements and the fusion of the pressure data and motion data (often referred to as 7-axis fusion) requires an integration of all the sensor processing. This integration may be an integral part of the system design from the start. However, in some situations mobile device 102 may be designed to simply use direct pressure measurement as an input. In this case, a self-correcting pressure sensor may be used that provides the system with a pressure measurement, but where the provided pressure data has been corrected to take all the above described effects into account. This self-correcting pressure sensor may either have integrated motion sensors or may have an input to obtain external motion data. Thus, the output of a self-correcting pressure sensor is in the same format as normal pressure data from a conventional pressure sensor, but in fact represents corrected and adjusted pressure data that may reliably be used to determine altitude. Effectively, this implements at least some of the functionality associated with correction module 224 in SPU 206, offloading this responsibility from host processor 202 and removing the need to modify any existing flight control module.

Figure 12:
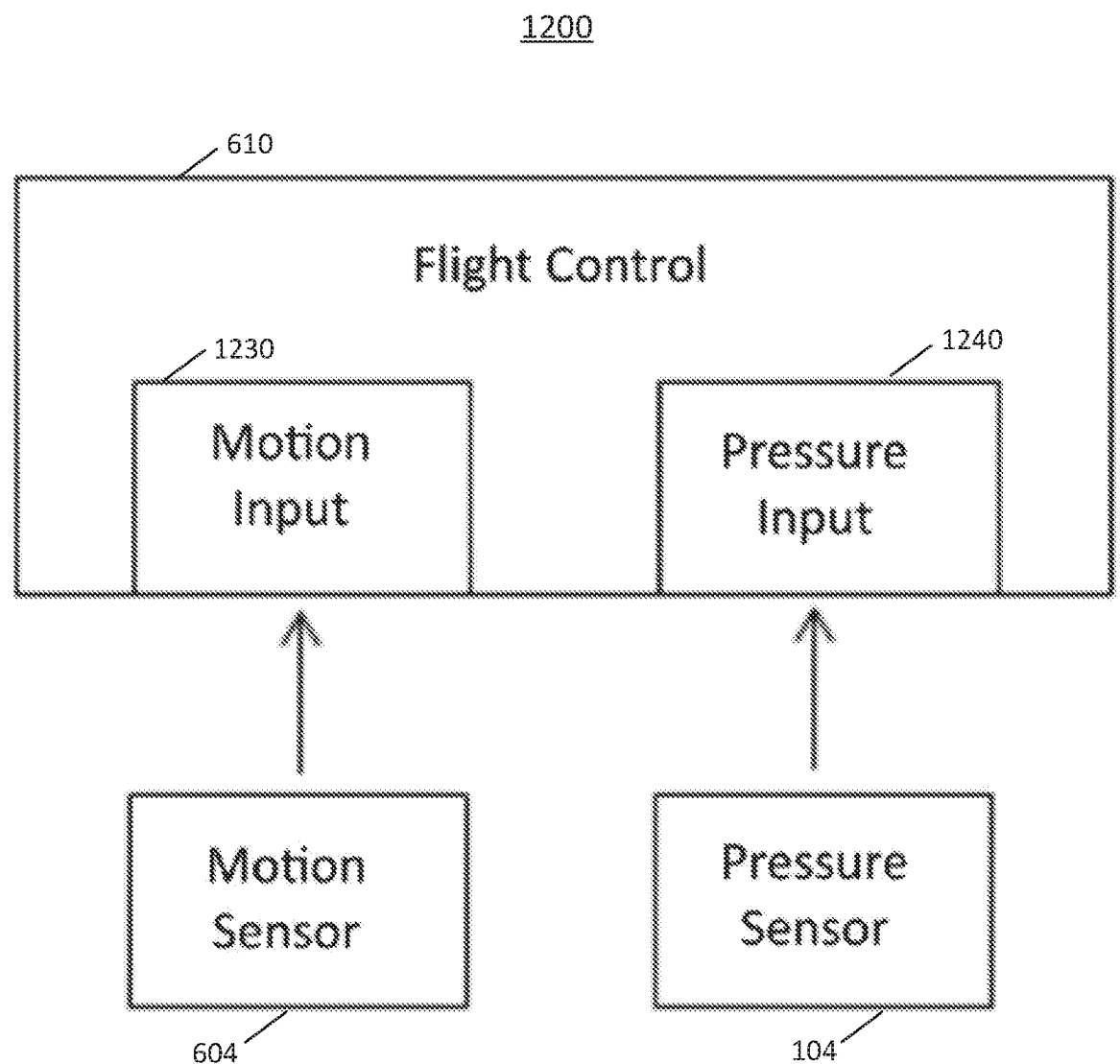
FIG. 12 is a schematic representation of an architecture for providing flight control using motion and pressure inputs.
Figure 13:
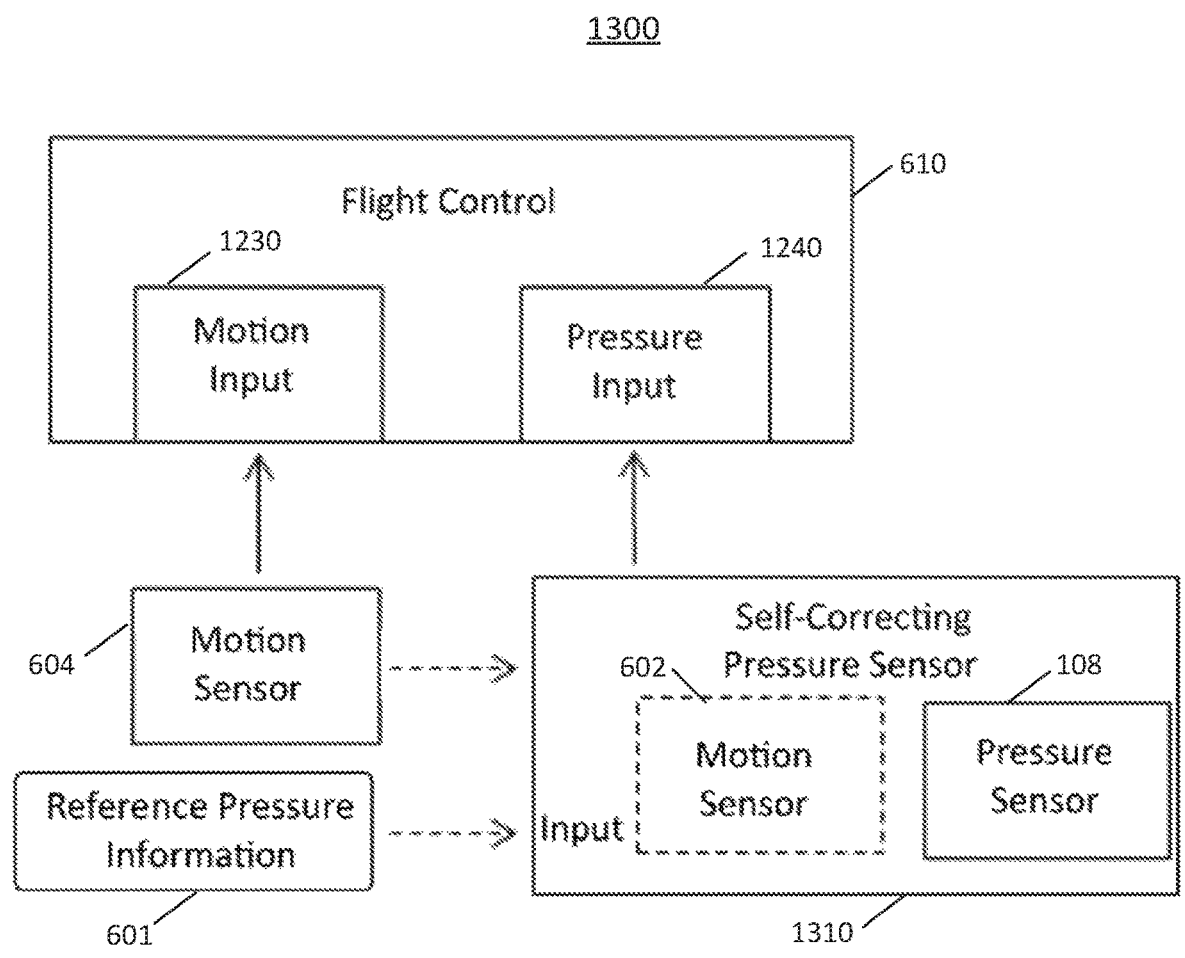
FIG. 13 is a schematic representation of an architecture for providing flight control using input from a self-correcting pressure sensor according to an embodiment.

Correspondingly, FIG. 12 schematically depicts an example of an architecture 1200 where the flight control 610 of a drone is designed to receive motion input 1230 from a motion sensor 604 and a pressure input 1240 to receive pressure data from a pressure sensor 104. Although the flight control 610 may determine the altitude of the drone based on the pressure sensor 104, it may not be designed to use reference pressure information according to the techniques of this disclosure. Use of reference pressure information in this architecture may require the flight control module to be modified, which is not always possible or desired. Therefore, FIG. 13 schematically depicts an architecture 1300 employing a self-correcting pressure sensor 1310, in which the pressure data is corrected or adjusted external to the flight control. As shown, the self-correcting pressure sensor 1310 may receive motion sensor data from external motion sensors 604 or may have dedicated motion sensors 602 that are integrated. The output of the self-correcting pressure sensor 1310 may be directly fed to the fight control module 610. Thus, the self-correcting pressure sensor 1310 may perform the motion and pressure data fusion using internal or external motion sensors and this processing may be done by a processor integrated with the self-correcting pressure sensor 1310, similar to SPU 206. As indicated by the comparison of FIG. 12 and FIG. 13, no modification of the flight control module 610 is needed to employ a self-correcting pressure sensor 1310.

Figure 14:
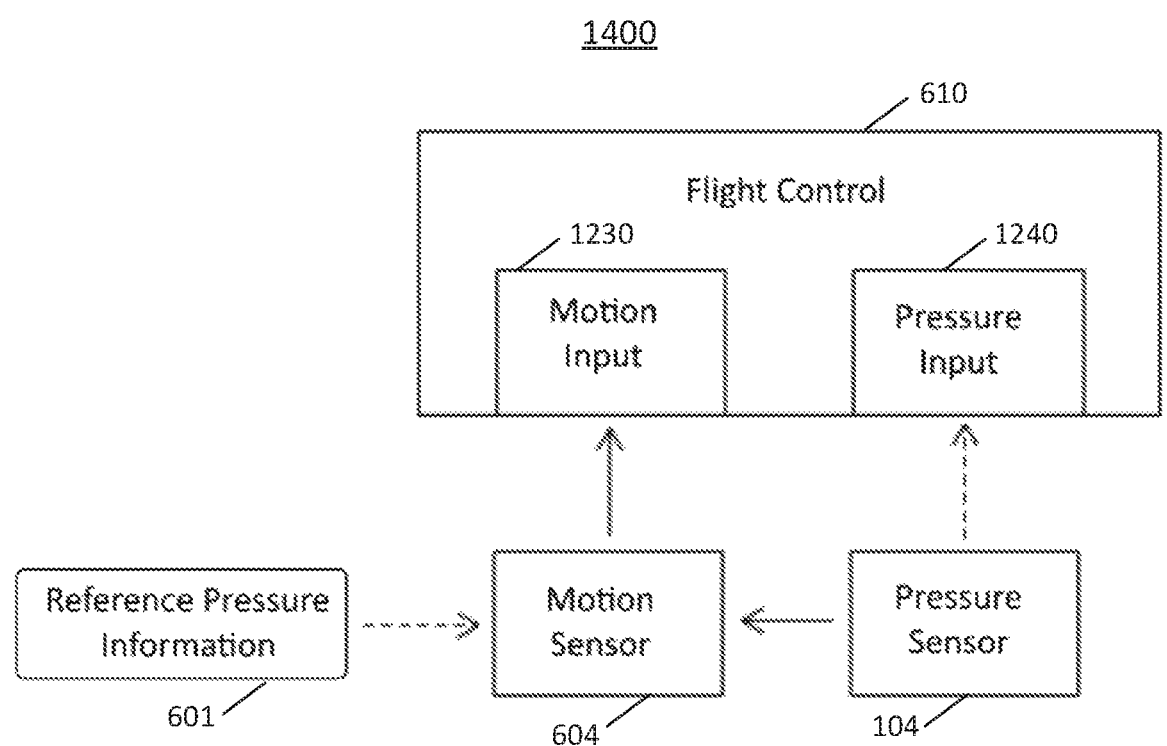
FIG. 14 is a schematic representation of supplying corrected motion sensor data using sensor fusion according to an embodiment.

In some architectures, the fusion of the motion data and the differential pressure measurements may be used to provide corrected motion data rather than corrected pressure data. One example embodiment is architecture 1400 which is schematically depicted in FIG. 14. As shown, the motion sensor 604 may receive both reference pressure information 601 as well as the measurements from an on-board pressure sensor 104. Following the techniques discussed above, the differential pressure measurements may be used to correct the motion data for any uncertainties or errors due to e.g., drifts or offsets or the accelerometer or gyroscope. As a result, the altitude of the device may be reliably determined based on the motion data as corrected using the reference pressure information. Optionally, the pressure data may no longer be used in order not to affect the corrected motion data negatively. Alternatively, the flight control 610 may not have a pressure sensor input, but may rely only on the corrected output of the motion sensor 604. The architectures (1300 and 1400) represented by FIG. 13 and FIG. 14 may also be combined in order to provided correction pressure data and corrected motion data, such that the best possible data is provided to the flight control (independent of how the flight control processes the data).

Although many of the preceding examples focused on the application of a drone and its flight control unit, the same architecture may also be applied to other mobile devices, such as e.g., a Head Mounted Display (HMD) system described above, or devices used for activity detection (smartphone, wearables, etc.), or in security systems (as discussed below). In these cases, the flight control module would be substituted with a corresponding module that benefits from more accurate altitude determination.

Use of Pressure Sensors in Security Systems

The motion of a mobile device 102, an auxiliary device 106, and/or pressure sensor (104/108) is not necessarily in all 3D dimensions. In some embodiments, the motion of the mobile device may be limited to two dimensions or one dimension, as long as at least motion in the vertical direction is possible/allowed since this motion leads to a change in pressure.

In some embodiments, the differential pressure sensing techniques discussed previously herein may be applied in security systems. For example, a pressure sensor on a window may be used to detect if the window is moving or not (in a vertical direction). Applications already exist where motion sensors (e.g., accelerometers) are used to detect movement of windows, but by slowly moving the window the movement may not be detected by an accelerometer. Similarly, by only using a single pressure sensor on the moving window, very slow movement may not always be detected because it may be interpreted as a change in background pressure. Thus, while a single pressure sensor is a viable solution in a security system to determine the opening of a window, it can have some issues which may be improved upon using differential pressure techniques. For example, by using a differential pressure sensor technique where a pressure measurement from a pressure sensor is compared with reference pressure, the security system becomes more secure and more foolproof than security systems which only magnetic sensors and/or accelerometers to detect vertical window motion.

Figure 15:
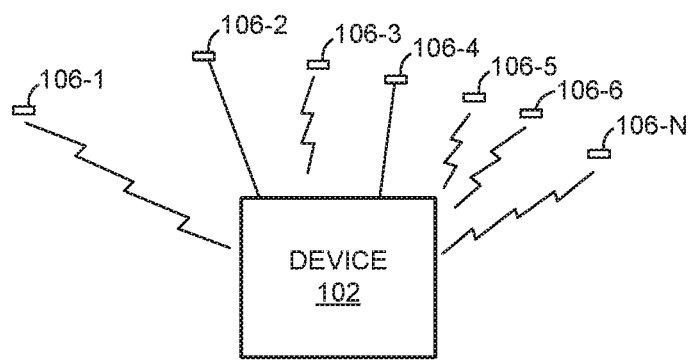
FIG. 15 depicts an example electronic security system for a building, according to various embodiments.

FIG. 15 depicts an example electronic security system 1500 for a building, according to various embodiments. In various embodiments, the building may be any type of structure that includes windows which open. In various embodiments the building may be any type of structure which has windows which open by moving up or down (e.g., single or double hung windows with sashes that move up and/or down to open). Security system 1500 includes one or more auxiliary devices 106 (106-1, 106-2, 106-3, 106-4, 106-5, 106-6 . . . 106-N depicted), each of which includes a pressure sensor, such as a pressure sensor 108 and may include one or more inertial sensors. Although seven auxiliary devices 106 are depicted, security system 1500 may have as little as one, or many more than seven, such as dozens, hundreds, thousands, or more. It should be appreciated that some embodiments may include a pressure sensor 108 as an external sensor to some other device (such as device 102 or auxiliary device 106). Security system 1500 also includes a computer system, such as device 102, with a memory 204, host processor 202, and a communications module 226 for sending and receiving information from the pressure sensors 108 or the devices (e.g., auxiliary devices 106-1 through 106-N) in which they are disposed. The computer system (i.e., device 102 in this example) acts as a central controller for security system 1500. Although device 102 is depicted as the computer system, other computer systems may be used. Security system 1500 may include other components, in some embodiments, such as inertial sensors (accelerometers, gyroscopes, and the like), magnetometers, and/or other environmental sensors which are implemented as internal or external sensors of one or more of device 102 and any of the auxiliary devices 106.

As depicted, in some embodiments, auxiliary devices 106 may be communicatively coupled wirelessly or via wireline with device 102 (or other computer system used for controlling electronic security system 1500). The depicted combination of wired and wireless couplings to device 102 is notional. In some embodiments, all communication to/from device 102 (or other computer system) may be via wireline communicative coupling with sensors and/or auxiliary devices 106. In some embodiments, all communication to/from device 102 (or other computer system) may be via wireless communicative coupling with sensors and/or auxiliary devices 106.

In other embodiments, auxiliary devices 106 may be utilized in a security system without being coupled to a central device 102. For example, an auxiliary device 106 may include a flashing light or siren which can be activated if it senses a condition which is indicative of a break in. Auxiliary device 106 may be in direct communication with an external device, such as e.g. the user's smartphone. This may enable the user to control auxiliary device 106, and auxiliary device 106 may output security conditions, such as e.g. position of the window or an intruder alarm, to the user directly. Similarly, two or more auxiliary devices 106 may communicate with each other, such as via wireline, WiFi, a mesh network, or other communication means. This communication may be independent of the presence or absence of device 102. Thus, in some embodiments, device 102 may not be required in a security system 1500 or the security system 1500 may continue to operate even when a device 102 is present but is offline or cannot communication with one or more auxiliary devices 106.

Figure 16A:
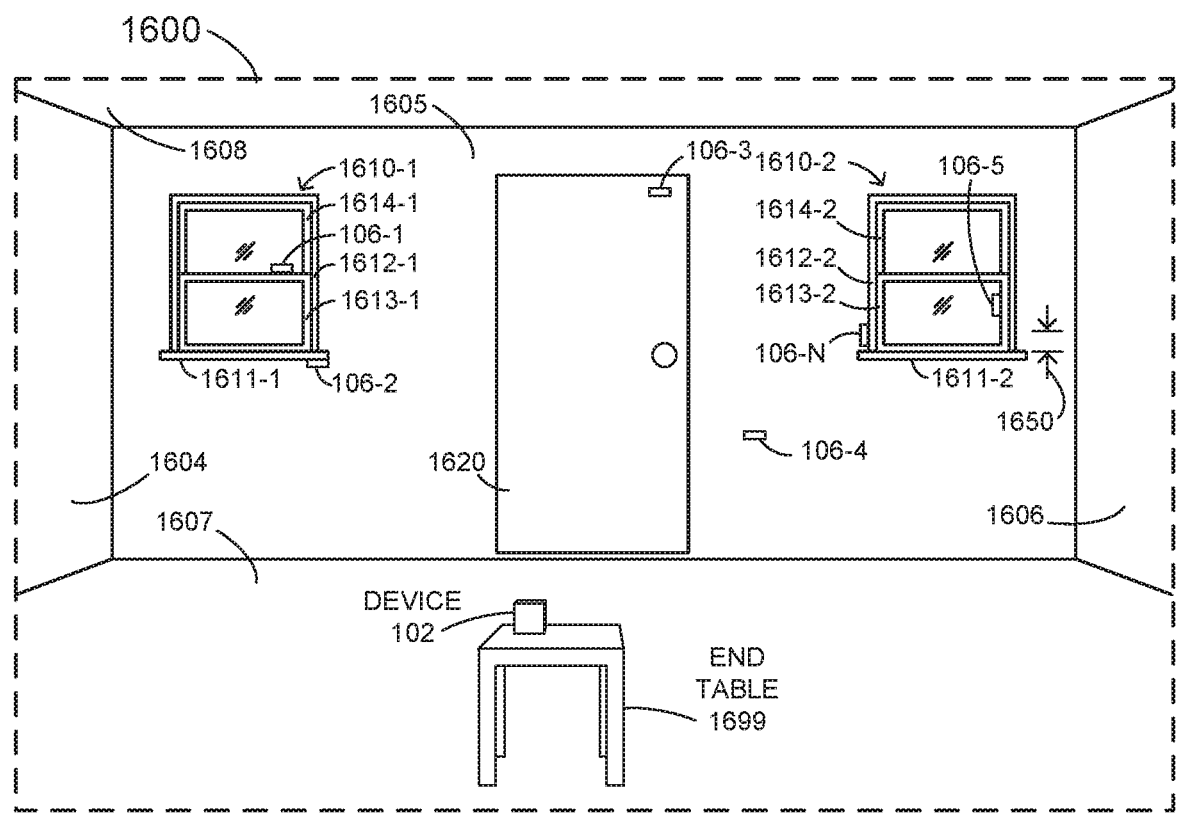
FIGS. 16A, 16B, and 16C depict the components (device 102 and auxiliary devices 106) of the electronic security system of FIG. 15 deployed to secure a building, according to various embodiments.
Figure 16B:
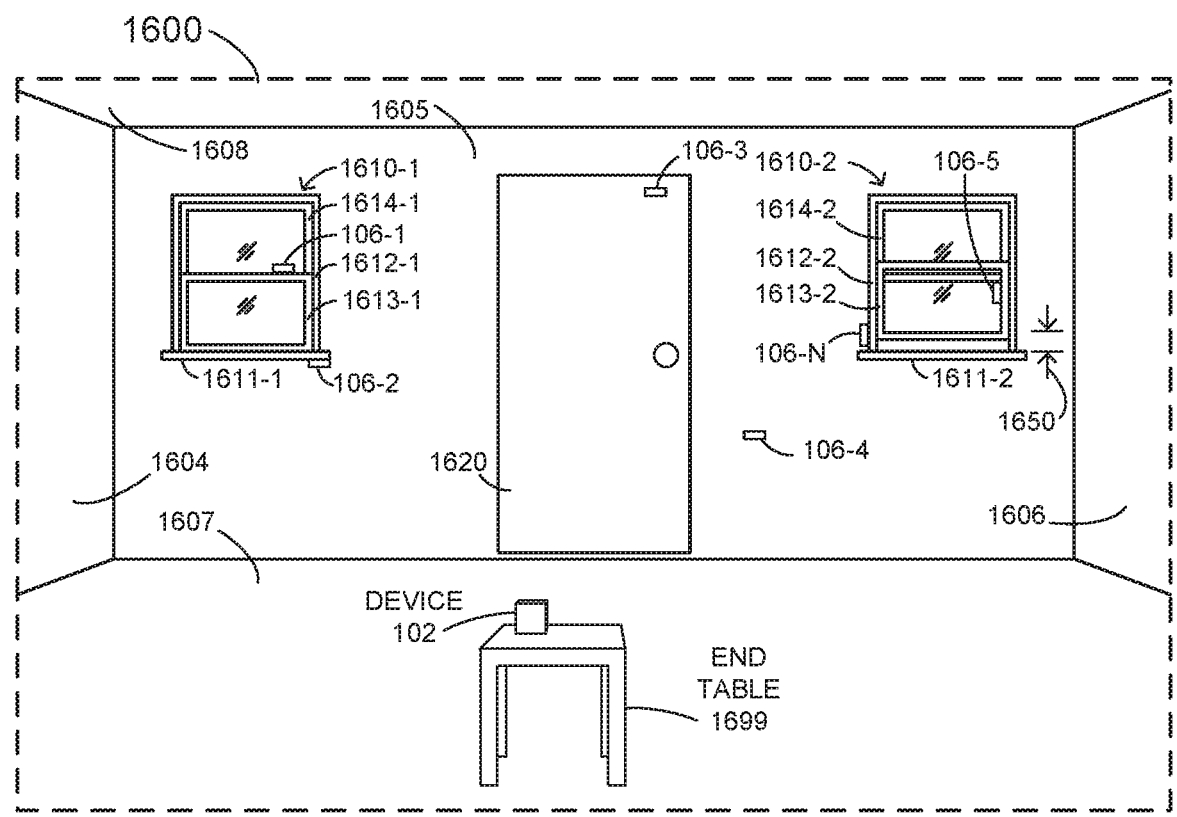
Figure 16C:
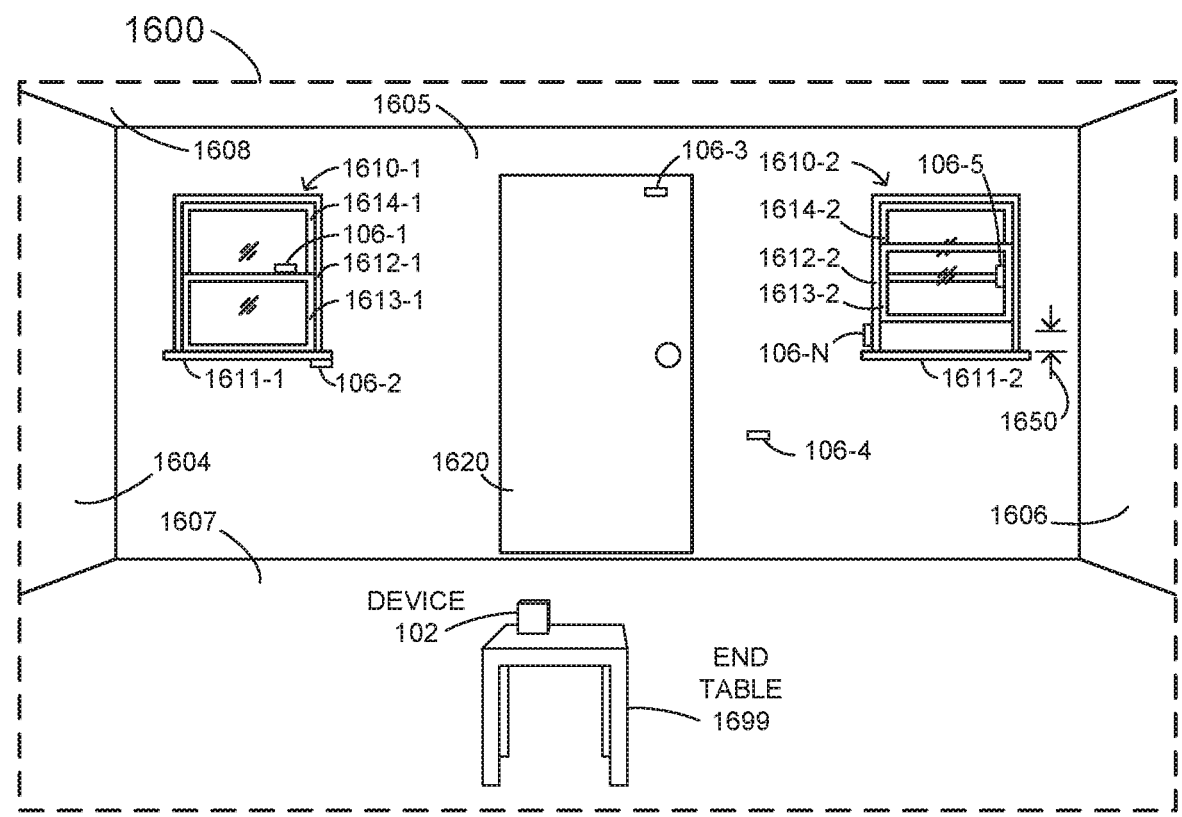

FIGS. 16A, 16B, and 16C depict the components (device 102 and auxiliary devices 106) of the electronic security system 1500 of FIG. 15 deployed to secure a building 1600, according to various embodiments. The interior of building 1600 is illustrated in a point perspective view. For purposes of brevity and clarity, only a small portion of the interior of building 1600 is depicted, to include: interior wall 1604, interior wall 1605, interior wall 1606, floor 1607, ceiling 1608, single hung window 1610-1, single hung window 1610-2, and door 1620.

Window 1610-1 has a sill 1611-1, a frame 1612-1, a lower sash 1613-1 which is a movable portion that moves up to open window 1610-1 and down to close window 1610-1, and an upper sash 1614-1 which is fixed in place and cannot be moved. For purposes of clarity, window 1610-1 is depicted without a casing. Auxiliary device 106-1, which includes a pressure sensor 108, is coupled with the upper rail of lower sash 1613-1 of window 1610-1, and thus moves up when lower sash 1613-1 is raised to open window 1610-1 and moves down when an opened sash 1613-1 is moved down to close window 1610-1. Auxiliary device 106-2, which includes a pressure sensor 108, is coupled with sill 1611-1, which is a non-moving portion of window 1610-1.

Auxiliary device 106-3 includes a pressure sensor 108 and is coupled with the inside facing panel/surface of door 1620. Auxiliary device 106-3 will move in a horizontal arc when door 1620 swings to open or close.

Auxiliary device 106-4, includes a pressure sensor 108, and is coupled with wall 1605, a non-moving surface, and is thus non-moving itself.

Window 1610-2 has a sill 1611-2, a frame 1612-2, a lower sash 1613-2 which is a movable portion that moves up to open window 1610-2 and down to close window 1610-2, and an upper sash 1614-2 which is fixed in place and cannot be moved. For purposes of clarity, window 1610-2 is depicted without a casing. Auxiliary device 106-5, which includes a pressure sensor 108, is coupled with the righthand stile of lower sash 1613-2 of window 1610-2, and thus moves up when lower sash 1613-2 is raised to open window 1610-2 and moves down when an opened sash 1613-2 is moved down to close window 1610-2. Auxiliary device 106-N, which includes a pressure sensor 108, is coupled with the jamb of frame 1612-2, which is a non-moving portion of window 1610-2.

Although single hung windows 1610-1 and 1610-2 are depicted in this example embodiment, up/down movements of the movable portions of double hung windows and other windows can be similarly detected by coupling pressure sensors 108 and/or auxiliary devices 106 (each of which includes a pressure sensor 108) to the movable portions of these windows in a similar manner to that illustrated in FIGS. 16A-16C.

In the foreground, an end table 1699 is positioned upon floor 1607. Resting upon end table 1699 is device 102, which is utilized as a central controller for electronic security system 1500. In the illustrated embodiments, device 102 is located remotely from windows 1610-1 and 1610-2. In some embodiments, device 102 includes a pressure sensor, such as pressure sensor 104. As was previously described in FIG. 15 auxiliary devices 106 (e.g., 106-1 through 106-N) and/or pressure sensors 108 are communicatively coupled with device 102 such that pressure measurements from the locations of these auxiliary devices 106 and/or pressure sensors 108 are communicated to device 102. For example, communications module 226 is a communication means of device 102 by which host processor 202 of device 102 communicates with and receives pressure measurements from pressure sensors of security system 1500 and/or from auxiliary devices 106 (each of which includes a pressure sensor) of security system 1500. As will be further discussed, host processor 202 of device 102 operates to compare with a reference pressure measurement a received pressure measurement that is associated with the movable portion of a window. In some embodiments, device 102 is a smart speaker hub/voice activated virtual assistant (e.g., Amazon Alexa, Amazon Echo, Apple's Siri, Sonos One, Google Assistant, Microsoft Cortana) or the like, and host processor 202 is a portion of this smart speaker hub/voice activated virtual assistant.

Threshold distance 1650 represents a threshold associated with window 1610-2. In some embodiments, for example, if window 1610-2 is opened more than the threshold distance 1650, device 102 does not allow an alarm mode of security system 1500 to be set/activated until the window 1610-2 is lowered to being at or below the threshold distance 1650. That is, the security system cannot be armed. In some embodiments, when the alarm mode of the security system has previously been set/activated, an act of opening the window 1610-2 above the threshold distance 1650 may cause the security system 1500 or device 102 to trigger an alarm. In some embodiments, when window 1610-2 is opened less than the threshold distance 1650, device 102 allows an alarm mode of the security system to be set/activated. Similarly, after an alarm mode of the security system is set/activated, device 102 and the security system may not trigger an alarm if window 1610-2 is opened a small distance that does not exceed threshold distance 1650. In various embodiments, the threshold distance 1650 may be set differently and is representative of a window opening amount which would not allow a burglar or other person to gain entry to building 1600. While threshold distance 1650 is depicted as a distance, it should be appreciated that this distance is associated with a differential in pressure between a pressure measured by a pressure sensor 108 of auxiliary device 106-5 and a reference pressure. A baseline differential is determined when the window is closed, with a second differential being associated with the window being opened to the threshold distance 1650. In some embodiments, whether or not an alarm mode of the security system has been set/activated, the act of opening window 1610-2 past the threshold distance 1650 may trigger a notification, such as causing a sound or light to be emitted or sending a notification to a selected device/account of the owner of building 1600. In some embodiments, an auxiliary device 106 (e.g., a device which senses a threshold distance 1650 being exceeded) may itself emit the sound (e.g., a siren sound) or light (e.g., a strobe or flashing light) in addition to or in alternative to sending a notification to a device (e.g., device 102) or location external to the auxiliary device 106.

In FIG. 16A window 1610-2 is closed. In FIG. 16B window 1610-2 is opened less than an amount associated with threshold distance 1650. In FIG. 16C window 1610-2 is opened more than an amount associated with threshold distance 1650.

Figure 16D:
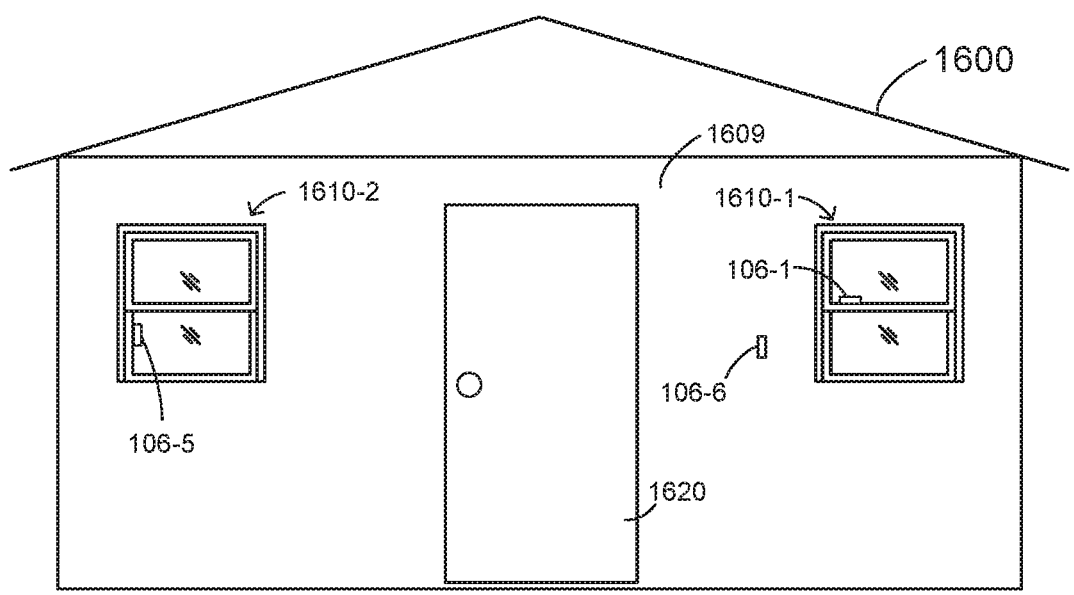
FIG. 16D depicts an external elevation view of the building of FIGS. 16A-16C in which the components (device 102 and auxiliary devices 106) of the electronic security system 1500 of FIG. 15 are deployed as a security system, according to various embodiments.

FIG. 16D depicts an external elevation view of the building 1600 of FIGS. 16A-16C in which the components (device 102 and auxiliary devices 106) of the electronic security system 1500 of FIG. 15 are deployed as a security system, according to various embodiments. As can be seen, in some embodiments, an auxiliary device 106-6, which includes a pressure sensor 108, is coupled with the non-moving outer wall 1609 of building 1600 or else is otherwise disposed outside of building 1600. In this manner, auxiliary device 106-6 can acquire pressure measurements of the atmosphere outside of building 1600. These measurements are then communicated to device 102 to provide external air pressure measurements for use in the operation of security system 1500.

In one embodiment, as illustrated in FIGS. 16A-16D, a plurality of windows may each be equipped with a single pressure sensor on the moving part of the window (e.g., pressure sensor 108 of auxiliary device 106-1 which is coupled with sash 1613-1 of window 1610-1 and pressure sensor 108 of auxiliary device 106-5 which is coupled with sash 1613-2 of window 1610-2), and their pressure data may be compared.

In some embodiments, a differential pressure is measured between a pressure sensor on the movable portion of a window and one or more other pressure sensors in the building, which may be on movable portions of a window or may be non-movable and fixed. The other pressure sensor(s) provide a reference pressure measurement or baseline to which a pressure measurement obtained from a pressure sensor coupled with the movable portion of a window is compared. When changes are noted in this comparison, they can be used to determine if the window is being opened or closed. If the window is open the pressure changes can be used to determine the amount (vertical distance) it is open. Along these lines, a great enough change noted in this comparison can be used as the basis for security system 1500 triggering an alarm.

Since it is highly unlikely that all windows in a building are moved at the same time during a break-in attempt, by measuring the differential pressure between the different pressure sensors of security system 1500, movement of a single window may be detected. For example, this may comprise comparing the data from the respective pressure measurements acquired by each pressure sensor in security system 1500 with the average of the pressure measurements of the other pressure sensors from the plurality of sensors in the room or the whole of building 1600 (which may be a home, office, business, school, factory, etc.). The pressure measurements from the other pressure sensors may be combined in a weighted average, where the weight of the pressure measurements from different pressure sensors is determined based on the distance to the pressure sensor which is being compared to the average. The further a pressure sensor is away from the pressure sensor being compared to the average, the smaller its weight may be when figured into the average. Delays in the pressure sensor readings due to the distances may also be corrected for in a similar manner. With reference to FIG. 16A, in one embodiment, for sash 1613-2 this comprises comparing the pressure measured by auxiliary device 106-5 with the average of the pressure measurements acquired by, one or more, auxiliary devices 106-1, 106-2, 106-3, 106-4, and 106-N during the same measurement timeframe. Similarly, for sash 1613-1 this comprises comparing the pressure measured by auxiliary device 106-1 with the average of the pressure measurements acquired by auxiliary devices 106-2, 106-3, 106-4, 106-5, and 106-N during the same measurement timeframe.

In some embodiments, security system 1500 may have a calibration/learning phase, where the influence of opening a window with one pressure sensor on its movable portion may influence the pressure sensor measurement of that sensor, and of the other pressure sensors on the other windows in the house. The calibration/learning phase may be used to set thresholds for determining when a window is opened and/or when it is opened enough to be a security concern. The calibration/learning phase may also be used to learn delays between the different sensors, i.e., how the opening of one window influences the pressure measured at another window, how long it takes for that influence to occur, and how measurements from various pressure sensors can be weighted to compensate for this influence. The calibration/learning phase may also be used to calibrate measurements based on delays between reporting of pressure measurement from the different pressure sensors. That is, security system 1500 may learn to compensate for differences in reporting time periods by determining a weighting to be applied to various measurements to compensate for this and thus synchronize the reported data. For example, internal air pressure in a building will likely change when a window is open and depending on when a pressure measurement is reported and the distance of the pressure sensor from the opened window, a received pressure measurement may need to be weighted to synchronize it with other pressure measurements until pressure equalization throughout the building occurs. If not set manually, the calibration/learning phase may also be used to determine which pressure sensors should be used to provide reference pressure measurements for other pressure sensors. This determination may be based on iteration or other techniques. The calibration/learning phase may also be used to determine and store baseline differences between a pressure measurement from a pressure sensor and the reference pressure to which it will be compared to determine if a window has moved. The calibration/learning phase may be done manually, for example the first-time security system 1500 is installed. Additionally, or alternatively, security system 1500 may automatically learn the correct (threshold) setting(s) during time periods when the alarm is not active (i.e., security system 1500 is functioning but not armed/activated to trigger alarms), and the users/owners of building 1600 open and close the windows. The pressure measurements and changes observed when security system 1500 was not active, may then be applied when security system 1500 is armed/activated. To save battery power, the use of the pressure sensors 108 and/or other sensors in auxiliary devices 106 may be at a lower frequency during the calibration/learning phase of security system 1500. To save battery power, the use of the pressure sensors 108 and/or other sensors in auxiliary devices 106 may be at a lower frequency when security system 1500 is not armed/activated. In some embodiments, this processing and learning may be done at each pressure sensor individually, such as by the auxiliary device 106 in which a pressure sensor 108 is located or to which a pressure sensor 108 is coupled as an external sensor. In other embodiments, this processing and learning or may be centralized, for example in a central control unit such as device 102 in security system 1500. The deviation of each sensor with respect to the average from the plurality of sensors in security system 1500 may be compared to a threshold to determine if a window has been moved or moved or moved a distance greater than is allowed for that window. This threshold (e.g., threshold distance 1650) may be fixed or may be learned and adjusted at each learning/inactive phase, which has the advantage of always being up to date based on the latest, e.g., context/environmental conditions.

Opening a window may also affect all the pressure sensors (if mounted on the inside) due to a difference in pressure between the indoors and the outdoors before the windows was opened. However, this change may be similar for the different sensors. Use of an external pressure sensor, such as in auxiliary device 106-6 of FIG. 16D allows security system 1500 to track the air pressure external to building 1600. Security system 1500 may then determine which pressure change is due to the vertical motion of the window.

The pressure sensor(s) in security system 1500 may also be configured to measure any air flow, which may also help determine if a window is opened.

In another embodiment, a first pressure sensor may be mounted on the moving part of the windows, and a second pressure sensor may be mounted on the stationary part of the same window to act as the reference pressure sensor which provides the reference pressure measurement for the first pressure sensor. In some embodiments, this may comprise the use of an additional pressure sensor per window, but it improves accuracy as the reference pressure sensor is very close to the pressure sensor that is on the moving part of the window and used to detect the motion. With reference to FIGS. 16A, 16B, and 16C, this embodiment is represented by window 1610-1 having auxiliary device 106-1 mounted on sash 1613-1 and auxiliary device 106-2 mounted on sill 1611-1. With continued reference to FIGS. 16A, 16B, and 16C, this embodiment is also represented by window 1610-2 having auxiliary device 106-5 mounted on sash 1613-2 and auxiliary device 106-N mounted on frame 1612-2.

When multiple windows are present in a room, each window may have its own separate reference pressure sensor, or only one fixed reference pressure sensor may be used for the plurality of pressure sensors in a room, in a floor of a building, or in a building. In such a configuration, the pressure sensors on the other windows may still be used as reference pressure sensors and their pressure measurements may either be combined with the pressure measurements from the dedicated reference pressure sensor or may be used as a backup/redundancy of in case there are issues with the reference pressure sensor. This means the system combines the principles of a direct reference sensor with the methods discussed in the previous paragraph. The reference pressure sensor may be mounted on one or more windows (the part that does not move), or the reference pressure sensor may be mounted in a central device. A central device may be the controller for security system 1500, but also may be any other centrally located stationary device that is equipped with a pressure sensor. In some embodiments, a reference pressure sensor may be mounted in a smart speaker hub/voice activated virtual assistant, such as e.g., the Amazon Echo or Google Home. In this case, the smart speaker hub may serve as the control unit for security system 1500. The reference pressure sensor may be built into the smart speaker hub or may be an add-on. Since the smart speaker hub is most likely not very close to the window, and certainly not coupled to a window, a calibration or learning phase may be employed as discussed above. If more than one smart speaker hub is in use, the smart speakers may work together, or each smart speaker may provide reference pressure measurements for use with the pressure sensors closest to the it. The reference pressure sensor may also be installed in a health care unit or elderly care unit and may be used as reference pressure sensor for home security as well as for personal security, such as e.g., a fall detection system for elderly. With reference to FIGS. 16A, 16B, and 16C, one such embodiment using a central pressure sensor is represented by window 1610-1 having auxiliary device 106-1 mounted on sash 1613-1 and using pressure measurements acquired by auxiliary device 106-4 or pressure measurements acquired by device 102 as the reference pressure measurements. In another such embodiment, auxiliary device 106-2, which is mounted on sill 1611-1, may provide backup pressure measurements for comparison to pressure measurements from auxiliary device 106-1. In another such embodiment, auxiliary device 106-2 may provide reference pressure measurements for comparison to pressure measurements associated with the movable portions of all windows in the room, meaning that auxiliary device 106-N on window 1610-2 is not needed or is only used as a backup.

In some embodiments, an external reference pressure measurement may be acquired from a pressure sensor installed outside of building 1600. This external reference pressure measurement may then be compared (e.g., by device 102 or by any of the auxiliary devices 106) with the internal reference pressure measurements acquired inside building 1600 to further assist in determining when a window has been opened. For example, when a window (e.g., window 1610-2) is opened from a closed state and all other windows in building 1600 are still closed, the pressure inside building 1600 should change in the direction of the pressure outside building 1600. If it does not, then security system 1500 can conclude a pressure measurement associated with the moving portion of a window, which would otherwise indicative of an opening window, is a false positive or a reading from an erroneous sensor. Incorporating external reference pressure measurements in this manner may be used to make security system 1500 more accurate and eliminate false positives. It may also be used to help troubleshoot poorly or erratically performing pressure sensors which may need to be replaced, adjusted, or serviced. In some embodiments, an external pressure measurement may be acquired from another source, such as a pressure/weather database accessed. For example, security system 1500 (e.g., device 102 or some other portion) may communicate via a wired or wireless connection to the Internet with such a pressure/weather database. In such an embodiment, auxiliary device 106-6 may not be utilized, but the techniques described in association with auxiliary device 106-6 may be.

In some embodiments, the use of pressure sensors may be combined with the use of other sensors to improve the reliability, accuracy, and/or battery consumption. For example, in some embodiments, pressure sensors may be combined with inertial sensors, such as e.g., accelerometers and gyroscopes, in an auxiliary device 106 which is used to measure movement of a window, door, or other aperture of a building.

Consider an embodiment where a combination of different types of sensors is used to increase the reliability of determinations that a widow has been opened. In such an embodiment, an accelerometer may be used to measure motion or vibrations of a window such as window 1610-2. However, if the window is moved very slowly, the motion may not be detected by the accelerometer because it is below the motion threshold which would trigger an output from the accelerometer. It is not always possible to decrease the motion threshold since that may result in issue with the noise level or may cause too many false positives triggered by other vibrations, leading to false alarms. Combining an accelerometer and a pressure sensor on the moving part of the window may increase the accuracy and reliability of the system. Both sensors may individually provide measurements (e.g., acceleration measurements and pressure measurements) used by an auxiliary device 106 or a central controller (e.g., device 102 in FIGS. 16A-16C) to decide whether the window has been moved, and then the results from both sensors may be combined to make an ultimate determination. Each separate determination based on only input from one sensor type may be done with a certain confidence, and the results of the determination from each of the separate types of sensor data may be combined. In the combination when making an ultimate determination from the separate determinations, the confidence of each separate determination may be taken into consideration, such as by assigning a weight to each of the determination based on associated levels of confidence. For example, a slow motion may only give low acceleration values, and the accelerometer may detect the window opening with a low confidence. However, if the window is slowly moved over a longer time, the total pressure change may cross the preset threshold to determine with a high confidence the window has moved and/or has moved more than a threshold distance. The accelerometer may also detect shocks, e.g., a ball hitting the window, which may be above the acceleration motion threshold. In such instances, the pressure measurements from the pressure sensor may then be used to verify these shocks and avoid false positives because the measured pressure would not change with a shock unless the window was broken or opened contemporaneously with the shock. Detection of a window opening using the pressure sensors may also be combined with other types of security component, such as e.g., video surveillance. For example, the detection of an opening by the pressure sensors may activate or trigger the video surveillance or change focus or draw attention to a certain location linked to the pressure sensor.

Consider an embodiment where a combination of different types of sensors is used to improve (decrease) the power consumption. In such an embodiment, a pressure sensor is very low power and uses less power in comparison to inertial sensors like an accelerometer or a gyroscope. Therefore, in some such embodiments, the pressure sensor may be "always on" or more frequently on that the other sensors. In such an arrangement, when the pressure sensor determines a pressure change, the accelerometer is activated to verify whether or not the window is moving. For example, a change in air conditioning may lead to a change in pressure that may trigger the accelerometer to be activated, but if the window is not being moved vertically the accelerometer measurements should indicate no motion. In such combinatorial uses of different types of sensors where one type sensor activates/triggers the use of another type of sensor for verification, the activation delay should be low enough not to miss any quick window motion. In some embodiments, when activated for verification, if the accelerometer has not detected any motion for a certain amount of time, the accelerometer may be deactivated again. It should be appreciated that an accelerometer and a pressure sensor may be incorporated in the same sensor processing unit 306, same auxiliary device 106, or on the same chip. In an embodiment where a reference pressure sensor is coupled with a non-moving portion of a window and is also equipped with accelerometer (e.g., as device 106 or SPU 306), the data from this accelerometer may also be used to eliminated false positives due to shock by comparing its readings with the readings of either or both of the pressure sensor coupled with the movable portion of the window or an accelerometer (if any) coupled with the movable portion of the window.

In a similar fashion, pressure measurements from a pressure sensor may also be combined with rotational motion measurements (angular velocity) acquired from a gyroscope in to validate determinations about whether a door or window has been opened. In this case, the application is not for sliding windows but for turning/swinging windows and doors. Even though no elevation change may take place, the pressure sensors may still be used to determine a change in pressure due to the opening of the door or window, and/or may be used to measure air flow, e.g., due to the swinging motion of the door or window. The combination of the measurements acquired from both pressure sensor and gyroscope may bring the same advantages as discussed above with the combination of the measurements from the pressure sensor and the accelerometer. It may improve accuracy and redundancy and may be used to eliminate false positives. It may also be used to improve (reduce) power consumption. For example, pressure measurements from a pressure sensor may also be used to turn on and off the gyroscope which uses even more power than an accelerometer. In such an embodiment, a pressure sensor may be used to trigger the activation of the gyroscope, but also as a trigger to start integrating the angular velocity measured by the gyroscope. As such, the (opening) angle of the door can be calculated, and it can be determined how far the door is opening once the door comes to a rest. It should be appreciated that a gyroscope and a pressure sensor may be incorporated in the same sensor processing unit 306, same auxiliary device 102, or on the same chip.

In some embodiments, an accelerometer, a gyroscope, and a pressure sensor may be incorporated in the same sensor processing unit 306, same auxiliary device 106, or on the same chip. In such an embodiment, pressure measurements from the pressure sensor may be used to trigger the activation of one or both of the accelerometer and the gyroscope in any of the manners described herein.

Use of Smart Speaker Hub as Central Controller

In some embodiments, any smart speaker "hub" (with or without pressure sensors) like Amazon Echo or Google home that has wireless connectivity can be used as a controller/computer system of security system 1500. These hubs can be connected to multiple doors/windows of a building which can be of more than 1 floor. Some responsibilities of a hub used in this manner are to acquire timestamp, pressure and temperature sensor data for each sensor unit (e.g., an auxiliary device 106) connected to it. This acquired data can then be stored and processed by the hub. Since such a hub acts as a gateway to a server/storage cloud it can store huge amounts of data if required and hence can perform long term analysis. Also, since it is communicating with multiple sensors at the same time it can establish relationships between them by analyzing data from all of them simultaneously. This hub-based infrastructure allows for following features/capabilities: 1) reduction of total number of sensors required to detect opening and closing of windows/doors; 2) detection of more events like HVAC on off, exhaust on off etc.; and 3) clock drift estimation to enable higher accuracy of timestamps; and 4) temperature correction parameters estimation for each sensor unit (e.g., an auxiliary device 106).

Using the hub concept, a single pressure sensor unit (e.g., a device 106) can be emplaced for a given floor/room and the data from this pressure sensor unit can be used as the reference pressure measurement inside this floor/room. Pressure measurements from pressure sensors coupled with the windows/doors in the room/floor of the building will be subtracted from the reference pressure measurement and data processing and algorithms for detection of opening/closing of window/door and further estimating the height of opening of window can be implemented on the hub. Since the same reference pressure measurement can be used for the units on same floor/room, in some such embodiments, there is no need of extra reference sensors on each window or door there by reducing the total number of units required to achieve same functionality.

Considering that events like opening/closing of window and door can impact not only the sensor on the window/door that is opened/closed but also the sensors near by; the hub can first learn and then use this relationship of variation of pressure across multiple sensors when an event happens. This relationship can be further used to reduce false positives. The relationship can be established as vector of pressure change across all the sensors for a given event (e.g., for the opening of a particular door/window). The magnitude of this change will be higher for nearby sensors. This vector should remain consistent when same event is repeated. Hence first this vector can be learned and once enough confidence is obtained, can be used to detect the event. Hence when an event like turning on/off of a fan/exhaust happens it might create the same change for single unit but its combined effect on all the nearby sensor units will not be same as that of opening of a window. Hence the vector of change in all the sensors will not be same even though for one particular sensor it is. This becomes important because a single sensor system can be fooled by these events and can create false triggers. This relationship can further be extended to detect events other than opening/closing of doors such as turning on/off of heating ventilation and air conditioning (HVAC), fans, exhaust, washer/dryer etc.

Since a hub has the capability of storing long term data like over a period of days or months or even longer, it can perform trend analysis or request offsite (e.g., cloud resources) performance of trend analysis. This kind of analysis can be used to establish parameters for correction of clock drift individually for each sensor unit. In literature it has been established that clock drift can occur because of temperature change from an ideal operating temperature of a clock. The relationship of drift is typically linear to this temperature induced difference. Here the hub can use the timestamp and temperature data from a sensor unit (e.g., an auxiliary device 106) to estimate the coefficients for this relationship. This can be done in following manner: 1) the hub communicates via the Internet to obtain the current world time very precisely; 2) the hub then provides this as the reference time to all the sensor units. Due to temperature variation, over a period of time, the internal clock of a sensor unit (e.g., an auxiliary device 106) will drift. The temperature variation can be because of climate of region, daily sunshine, HVAC settings in a building, etc. Whenever there is a synchronization between the hub and a sensor unit, the hub can use the now drifted timestamp from the pressure sensor unit and current time from Internet to establish the drift. Since it also has the temperature during this period (either from the sensor unit or due to directly measuring the temperature) the hub can predict and correct the estimation of coefficients for this operating temperature and the relationship of drift.

As discussed, a hub is capable of storing long term data, it can also store data from sensors like pressure sensors, temperature sensors, accelerometers, and gyroscopes. In some embodiments, a hub then uses the data from motion sensors to identify "no motion" durations. This can be done by an algorithm that monitors variation of accelerometer and gyroscope data over a long period of time, and when the variation and its nonlinear transformations are within a certain threshold, it can be established that the device (and a window or door to which it is coupled) is stationary. Also, the pressure sensor data from nearby pressure sensors to the hub can be used to extract durations when there is no significant change in pressure for the room/floor/house. In some embodiments, during such durations of "no motion," if any of the pressure sensors observes variation in pressure, the hub can determine whether this change is because of temperature change or actual pressure change. For example, pressure sensors exposed directly to sunlight can be affected because of this error related to temperature fluctuation. The hub can perform a temperature correction to determine if the pressure measurement actually reflects a change in pressure. It has been established that this kind of temperature compensation can be modeled as a linear relationship between the pressure correction, with the temperature difference from ideal temperature. Since this relationship may depend on packaging and soldering of the pressure sensor in a device in which it is disposed, it will typically be different for each sensor unit or device in which a pressure sensor is disposed. The hub can estimate these correction parameters or the coefficients of this linear relation using the long-term data that it has stored. In some embodiments, an algorithm that does this can be implemented as follows: 1) the hub stores and then acquires pressure measurements and temperature measurements for a whole day (or other period of time). For each sensor unit (e.g., for each auxiliary device 106), from its accelerometer measurements and/or gyroscope measurements the hub can identify durations when the sensor unit was static. The hub can further corroborate this by monitoring pressure sensor data from nearby sensors to the sensor unit for those durations and further extracting those durations when the accelerometer and/or gyroscope data from nearby sensors is also indicative of being stationary. For these durations, it can extract temperature and pressure data. In the stationary durations, if the temperature has changed beyond a threshold in a given time window, the algorithm can extract the corresponding change in pressure for the same time window and store data for temperature and pressure for the whole window. Once statistically significant data from these time windows are obtained, it can then use curve fitting to estimate correction parameters or the coefficients of this linear relation. This algorithm can be applied on all sensor units (e.g., auxiliary devices 106) individually.

In some embodiments, a window may be equipped with a processor module (e.g., an auxiliary device 106 or a sensor processing unit 306) that includes a reference pressure sensor 108 and the second pressure sensor might be connect to the processing module as an external sensor using a flexible wire. For example, with reference to FIG. 2, the second pressure sensor may be external sensor 314. The processor (e.g., sensor processor 208) can read data from both the sensors and send out the difference in pressure to the central hub. This setup avoids the task of tracking the clock drift between two separate devices that separately report pressure measurements from the first pressure sensor and the second pressure sensor.

Example Methods of Operation

Figure 17B:
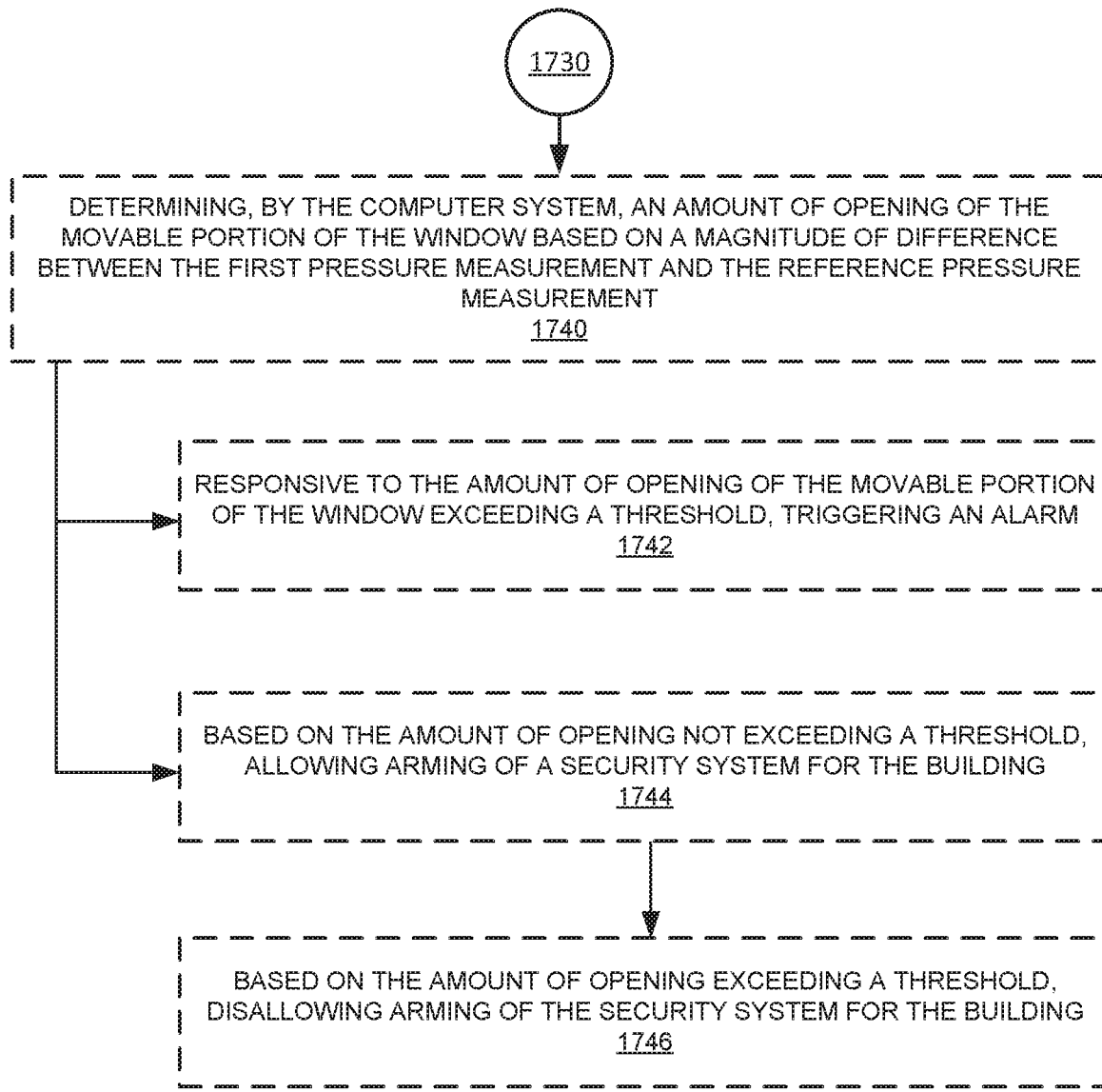

FIGS. 17A-17C illustrate a flow diagram of an example method of detecting movement of a movable portion of a window in a building, according to various embodiments. Procedures of this method will be described with reference to elements and/or components of one or more of FIGS. 1-16D. It is appreciated that in some embodiments, the procedures may be performed in a different order than described, that some of the described procedures may not be performed, and/or that one or more additional procedures to those described may be performed. Flow diagram 1700 includes some procedures that, in various embodiments, are carried out by one or more processors (e.g., sensor processor 208, sensor processor 308, host processor 202, or the like) under the control of computer-readable and computer-executable instructions that are stored on non-transitory computer-readable storage media (e.g., memory 204, memory 210, memory 310, or the like). It is further appreciated that one or more procedures described in flow diagram 1700 may be implemented in hardware, or a combination of hardware with firmware and/or software.

With reference to FIG. 17A, at procedure 1710 of flow diagram 1700, in various embodiments, a computer system receives a first pressure measurement from a pressure sensor coupled with a movable portion of a window. With reference to FIGS. 16A-16D, in some embodiments a computer system, such as device 102, receives a first pressure measurement from a pressure sensor coupled with sash 1613-2 of single hung window 1610-2. In this embodiment, the pressure sensor comprises a pressure sensor 108 included within the sensor processing unit 306 of auxiliary device 106-5 which is coupled with sash 1613-2. Although auxiliary device 106-5 is coupled with a stile of sash 1613-2, in other embodiments it (or some other package including a pressure sensor 108) may be coupled with any portion of sash 1613-2.

With reference to FIG. 17A, at procedure 1720 of flow diagram 1700, in various embodiments, the computer system compares the first pressure measurement to a reference pressure measurement. The comparison may involve a processor of a computer system, such as a processor of device 102 or of an auxiliary device 106, determining a difference between the first pressure measurement and the reference pressure measurement. The reference pressure measurement may be taken from one pressure sensor or be a combined (i.e., average) measurement from a plurality of pressure sensors.

In some embodiments, for example, the reference pressure measurement comprises a stored pressure measurement that has been previously received from the pressure sensor which provided the first pressure measurement. The stored pressure measurement may be a single stored pressure measurement that has been received prior to the first pressure measurement (e.g., the most recent previously received pressure measurement), a stored running average of the pressure measurements previously received from the pressure sensor, or a stored average of a predetermined number of previous pressure measurements from the pressure sensor. With reference to FIGS. 16A-16D, this may comprise a computer system (e.g., device 102 or auxiliary device 106) storing one or more pressure measurements previously received from auxiliary device 106-5 and then using one of these previously received pressure measurements or some average value calculated from two or more of these previously received pressure measurements as the reference pressure measurement.

In some embodiments, the reference pressure measurement comprises a second pressure measurement received by the computer system from a second pressure sensor coupled with a non-moving portion of the window. With reference to window 1610-2 of FIGS. 16A-16D, this comprises a computer system (e.g., device 102 or auxiliary device 106) receiving the second pressure measurement from a pressure sensor in auxiliary device 106-N which is coupled to the non-moving jamb of the frame 1612-2 of window 1610-2. This second pressure measurement may be received by the computer system contemporaneously (e.g., in the same measurement cycle) with receipt of the first pressure measurement or else within a predefined short time period such as 3 seconds prior to 1 second after receipt of the first pressure measurement.

In some embodiments, the reference pressure measurement comprises a second pressure measurement received by the computer system from a second pressure sensor coupled with a second window that is different from the window. With reference to FIGS. 16A-16D, when the first pressure measurement is received from a pressure sensor coupled with the sash 1613-2 of window 1610-2, this comprises a computer system (e.g., device 102 or auxiliary device 106) receiving the second pressure measurement from a pressure sensor coupled with a second window, such as window 1610-1. In some embodiments, this comprises receiving the second pressure measurement from a pressure sensor 108 in auxiliary device 106-2 which is coupled to the non-moving sill of window 1610-1. Because it is unlikely that multiple windows will be opened simultaneously in a break-in situation, in some embodiments, this may also comprise receiving the second pressure measurement from a pressure sensor in auxiliary device 106-1 which is coupled to the upper rail of the (movable) sash 1613-1 of window 1610-1. In either case, this second pressure measurement may be received by the computer system contemporaneously (e.g., in the same measurement cycle) with receipt of the first pressure measurement or else within a predefined short time period such as 3 seconds prior to 1 second after receipt of the first pressure measurement.

In some embodiments, the reference pressure measurement is obtained by the computer system from at least one of a plurality of additional pressure sensors associated with the building. With reference to FIGS. 16A-16D, when the first pressure measurement is received from a pressure sensor coupled with the sash 1613-2 of window 1610-2, this comprises a computer system (e.g., device 102 or auxiliary device 106) receiving the second pressure measurement from at least one of a plurality of additional pressure sensors associated with building 1600. For example, the second pressure measurement may be received from any of auxiliary devices 106-1, 106-2, 106-3, 106-4, 106-N, or a pressure sensor 104 which is coupled with device 102. This second pressure measurement may be received by the computer system contemporaneously (e.g., in the same measurement cycle) with receipt of the first pressure measurement or else within a predefined short time period such as 3 seconds prior to 1 second after receipt of the first pressure measurement.

In some embodiments, the reference pressure measurement comprises an average of pressure measurements received by the computer system from a plurality of pressure sensors in the building. With reference to FIGS. 16A-16D, when the first pressure measurement is received from a pressure sensor coupled with the sash 1613-2 of window 1610-2, this comprises a computer system (e.g., device 102 or auxiliary device 106) receiving and averaging pressure measurements from any two or more of auxiliary devices 106-1, 106-2, 106-3, 106-4, 106-N, and a pressure sensor 104 which is coupled with device 102. The individual pressure measurements averaged to achieve the reference pressure measurement may be received by the computer system contemporaneously (e.g., in the same measurement cycle) as receipt of the first pressure measurement, within a predefined short time period such as 3 seconds prior to 1 second after receipt of the first pressure measurement, or the average may be a running average over a predetermined period of time. As previously described, weighing may be applied to pressure measurements received from one or more of the sources that are averaged together.

In some embodiments, the reference pressure measurement comprises a second pressure measurement received from a reference device located remotely from the window. With reference to FIGS. 16A-16D, when the first pressure measurement is received from a pressure sensor coupled with the sash 1613-2 of window 1610-2, this comprises a computer system (e.g., device 102 or auxiliary device 106)

receiving the second pressure measurement from auxiliary devices 106-1, 106-2, 106-3, 106-4, or from a pressure sensor 104 which is coupled with device 102.

With continued reference to FIG. 17A, at procedure 1730 of flow diagram 1700, in various embodiments, based on the comparison, it is detected that the movable portion of the window has moved. With reference to FIGS. 15 and 16A-16D, the computer system (e.g., device 102 or an auxiliary device 106) determines based on the comparison whether the window has been opened. As previously described, the pressure sensors in use can measure very small changes in pressure (as little as 1 pa which would be associated with vertical movement up/down of about 5 cm). A difference between the first pressure measurement and the reference pressure measurement can be compared with a baseline difference obtained when the window was known to be closed and, based on the amount/magnitude of difference between the baseline and the present comparison, the computer system can determine if the movable portion of the window is closed (e.g., if the comparison yields no difference when compared to the baseline comparison) or open (e.g., if the comparison yields some difference when compared to the baseline comparison).

With reference to FIG. 17B, at procedure 1740 of flow diagram 1700, in various embodiments, the method as described in 1710-1730 further comprises determining, by the computer system, an amount of opening of the movable portion of the window based on a magnitude of difference between the first pressure measurement and the reference pressure measurement. For example, because the pressure sensors in use can measure very small changes in pressure, the difference in the comparison of the first pressure measurement to the reference pressure can be compared to a baseline difference that has been calculated at a time when the movable portion of the window was closed. Because changes in atmospheric pressure will affect any pressure sensors inside building 1600 equally, regardless of elevation difference between the sensors, any difference between the current comparison and the baseline comparison indicates a change in height of the movable portion of the window. In an embodiment, where the sensors can measure pressure differences with an accuracy of 1 pa, a 2 pa difference between the current comparison and the baseline comparison equates to the movable portion of the window being opened by approximately 10 cm. Use of more or less accurate pressure sensors will impact the resolution of such an amount of opening determination. The amount of opening of the window can be expressed e.g., as a distance of opening or movement, a portion/percentage of the total opening amount, a safe or unsafe opening, or as a pressure differential from a closed state (where the differential may be a predetermined value). The percentage of opening can be compared to the maximum observed opening which can be used as a calibration of the opening percentage. As discussed above, when opening a window when there is a difference with the outside air pressure, the resulting pressure change can be a combination of pressure equalization and movement of the window. The system may separate the contribution due to equalization and window movement to determine the correct distance of movement. The contribution due to equalization may be determined based on pressure data from other pressure sensors not on the window being moved. For example, a buffer time between noticing a pressure change with a pressure sensor in an auxiliary device 106 and activation of an alarm may be utilized to determine if the pressure change is noticed by other auxiliary devices 106 in a manner characteristic of starting or stopping of an HVAC (heating ventilation and air conditioning) system. In some embodiments, the computer system provides information to a user application to inform a user (e.g., a home owner or business owner) of security system 1500 which window(s) are open and by how much they are open. In this manner, a user can determine whether the amount of opening of a particular window is something to be concerned about.

With continued reference to FIG. 17B, at procedure 1742 of flow diagram 1700, in various embodiments, responsive to the amount of opening of the movable portion of the window exceeding a threshold, an alarm is triggered. This threshold is typically set based on the accuracy of the pressure sensors in use and a distance of opening which would make a break in possible. In some embodiments, for example, this threshold may be set to 10 cm (equivalent to a 2 pa pressure change versus a closed window). FIGS. 16A-16C illustrate a threshold distance 1650, which in this example may be considered to be 10 cm. When the computer system determines that the movable portion of the window has been opened more than 10 cm (e.g., beyond threshold distance 1650 as shown in FIG. 16C), it triggers an alarm. The triggering may involve the computer system causing the emission of alarm sounds (e.g., sirens), activating lights, and/or calling or otherwise sending a message to a user, a remote response center, a police station, or the like to indicate that a window has been opened in building 1600 and/or that a break-in may be occurring. In embodiments where no threshold window opening distance has been established, any amount of opening of the window may result in the computer system triggering an alarm. In some embodiments, a plurality of thresholds may be used, with different actions associate with passing the different thresholds. For example, a low first threshold may be used to activate other sensors or increase the data rate of the pressure sensors when it is exceeded. A second higher threshold may be used to heighten awareness or trigger an alarm when it is exceeded.

With continued reference to FIG. 17B, at procedure 1744 of flow diagram 1700, in various embodiments, based on the amount of opening not exceeding a threshold, the computer system allows arming/activating of the security system for the building. Continuing the previous example, where the threshold is set at 10 cm, when the movable portion of a window is determined to be open a distance of 10 cm or less, the computer system will allow a user to arm security system 1500. This means that one or more windows may be open a small distance (10 cm or less in this example) when the security system 1500 is armed/activated and its alarm is set, which is not possible in a conventional security system which uses a set of magnetic reed switches to determine only if a window is in an opened or closed state. With reference to FIG. 16B, device 102 would allow arming/activating of securing system 1500 while window 1610-2 is open a distance that is less than threshold distance 1650.

With continued reference to FIG. 17B, at procedure 1746 of flow diagram 1700, in various embodiments, based on the amount of opening exceeding a threshold, arming/activating of the security system for the building is disallowed. Continuing the previous example, where the threshold is set at 10 cm, when the movable portion of a window is determined to be open a distance of greater than 10 cm (e.g., 15 cm), the computer system will disallow arming/activating of security system 1500. The computer system may inform the user that security system 1500 cannot be armed/activated because a particular window, such as window 1610-2 in FIG. 16C, is opened beyond threshold distance 1650.

With continued reference to FIG. 17C, at procedure 1750 of flow diagram 1700, in various embodiments, responsive to the detecting that the movable portion of the window has moved, the computer system activates an inertial sensor coupled to the moving portion of the window. As previously discussed, pressure sensors utilize less power than inertial sensors such as accelerometers and gyroscopes. Because of this, a pressure sensor coupled with the movable portion of a window may be operated in an always on mode and may be used to trigger one or more inertial sensors (also coupled with the movable portion of the window) to turn on and acquire measurements when a pressure change from the pressure sensor is enough to be associated with movement of the movable portion of a window. For example, a 1 pa pressure change from one measurement to the next over less than a second may trigger one or more inertial sensors coupled with the movable portion of a window to be activated and acquire measurements. In some embodiments, a contemporaneous measurement acquired by a triggered accelerometer can be used to confirm or validate that a movable portion of a window is indeed moving or else invalidate that it is moving and may thus help prevent false positive determinations of window movement made by changes in pressure only. With reference to FIGS. 16A-16C, this may comprise auxiliary device 106-5 measuring a pressure change indicative of sash 1613-2 moving and then triggering an accelerometer of auxiliary device 106-5 to begin measuring acceleration of sash 1613-2.

With continued reference to FIG. 17C, at procedure 1760 of flow diagram 1700, in various embodiments, after the inertial sensor has been triggered the computer system receives an inertial measurement from the inertial sensor. This can involve receiving an acceleration measurement from an accelerometer and/or an angular velocity measurement from a gyroscope. With reference to FIGS. 16A-16C, this may comprise auxiliary device 106-5 measuring acceleration of sash 1613-2 and the acceleration measurement being received by device 102 and/or it may involve the acceleration measurement being evaluated on-board auxiliary device 106-5.

With continued reference to FIG. 17C, at procedure 1770 of flow diagram 1700, in various embodiments, in response to the inertial measurement indicating movement of the movable portion of the window, the computer system validates the detection that the movable portion of the window has moved. Based on an evaluation by device 102 (or even on-board auxiliary device 106-5) the inertial measurements (e.g., acceleration measurements) will either validate or invalidate movement indicated by the measured pressure change.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

In accordance with the embodiments shown, one of ordinary skill in the art will readily recognize that there could be variations to the embodiments and those variations would be within the spirit and scope of what has been disclosed. Accordingly, many modifications may be made by one of ordinary skill in the art without departing from the spirit and scope of the disclosure.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A security system for a building, the security system comprising:
   a pressure sensor coupled to a movable portion of a window in the building and configured to measure atmospheric pressure; and
   a computer system communicatively coupled with the pressure sensor and configured to:
      receive a first pressure measurement from the pressure sensor, wherein the first pressure measurement provides atmospheric pressure at the pressure sensor;
      compare the first pressure measurement to a reference pressure measurement, wherein the reference pressure measurement is measured by a source other than the pressure sensor; and
      based on the comparison, detect that the movable portion of the window has moved.

2. The security system of claim 1, wherein the computer system is further configured to:
   determine an amount of opening of the movable portion of the window based on a magnitude of a difference between the first pressure measurement and the reference pressure measurement.

3. The security system of claim 2, wherein the computer system is further configured to:
   trigger an alarm in response to the amount of opening of the movable portion of the window exceeding a threshold.

4. The security system of claim 2, wherein the computer system is further configured to:
   allow arming of the security system for the building based on the amount of opening not exceeding a threshold; and
   disallow arming of the security system for the building based on the amount of opening exceeding the threshold.

5. The security system of claim 1, wherein the computer system is further configured to:
   responsive to detecting that the movable portion of the window has moved, activate an inertial sensor coupled to the moving portion of the window;
   receive an inertial measurement from the inertial sensor; and
   responsive to the inertial measurement indicating movement of the movable portion of the window, validate the detection that the movable portion of the window has moved.

6. The security system of claim 1, further comprising:
   a second pressure sensor coupled with a non-moving portion of the window and configured to measure atmospheric pressure at the second pressure sensor; and wherein the reference pressure measurement comprises a second pressure measurement received by the computer system from the second pressure sensor.

7. The security system of claim 1, further comprising:
a second pressure sensor coupled with a second window that is different from the window, wherein the second pressure sensor is configured to measure atmospheric pressure at the second pressure sensor; and
wherein the reference pressure measurement comprises a second pressure measurement received by the computer system from the second pressure sensor.

8. The security system of claim 1, further comprising:
a plurality of additional pressure sensors associated with the building, wherein each of the plurality of additional pressure sensors is configured to measure atmospheric pressure at its respective location; and
wherein the computer system is configured to select at least one of the plurality of additional pressure sensors to provide the reference pressure measurement.

9. The security system of claim 1, further comprising:
wherein the reference pressure measurement is based on pressure measurements received by the computer system from a plurality of pressure sensors in the building, wherein each of the plurality of pressure sensors is configured to measure atmospheric pressure at its respective location.

10. The security system of claim 1, wherein the reference pressure measurement comprises a second pressure measurement received from an electronic device located remotely from the window.

11. The security system of claim 1, wherein the computer system comprises an electronic device located remotely from the window.

12. A method of detecting movement of a movable portion of a window in a building, the method comprising:
receiving, by a computer system, a first pressure measurement from a pressure sensor coupled with the movable portion of the window, wherein the first pressure measurement provides atmospheric pressure at the pressure sensor;
comparing, by the computer system, the first pressure measurement to a reference pressure measurement, wherein the reference pressure measurement is measured by a source other than the pressure sensor; and
based on the comparison, detecting that the movable portion of the window has moved.

13. The method as recited in claim 12, further comprising:
determining, by the computer system, an amount of opening of the movable portion of the window based on a magnitude of difference between the first pressure measurement and the reference pressure measurement.

14. The method as recited in claim 13, further comprising:
responsive to the amount of opening of the movable portion of the window exceeding a threshold, triggering an alarm.

15. The method as recited in claim 13, further comprising:
based on the amount of opening not exceeding a threshold, allowing arming of a security system for the building; and
based on the amount of opening exceeding the threshold, disallowing arming of the security system for the building.

16. The method as recited in claim 12, further comprising:
responsive to the detecting that the movable portion of the window has moved, activating, by the computer system, an inertial sensor coupled to the moving portion of the window;
receiving an inertial measurement from the inertial sensor; and
responsive to the inertial measurement indicating movement of the window, validating the detection that the movable portion of the window has moved.

17. The method as recited in claim 12, wherein the comparing the first pressure measurement to a reference pressure measurement comprises:
determining, by the computer system, a difference between the first pressure measurement and the reference pressure measurement, wherein the reference pressure measurement comprises a stored pressure measurement previously received from the pressure sensor.

18. The method as recited in claim 12, wherein the comparing the first pressure measurement to a reference pressure measurement comprises:
determining, by the computer system, a difference between the first pressure measurement and the reference pressure measurement, wherein the reference pressure measurement comprises a second pressure measurement received by the computer system from a second pressure sensor coupled with a non-moving portion of the window and configured to measure atmospheric pressure at the second pressure sensor.

19. The method as recited in claim 12, wherein the comparing the first pressure measurement to a reference pressure measurement comprises:
determining, by the computer system, a difference between the first pressure measurement and the reference pressure measurement, wherein the reference pressure measurement comprises a second pressure measurement received by the computer system from a second pressure sensor that is configured to measure atmospheric pressure at the second pressure sensor and is coupled with a second window that is different from the window.

20. The method as recited in claim 12, wherein the comparing the first pressure measurement to a reference pressure measurement comprises:
determining, by the computer system, a difference between the first pressure measurement and the reference pressure measurement, wherein the reference pressure measurement is obtained by the computer system from at least one of a plurality of additional pressure sensors associated with the building, wherein each of the plurality of additional pressure sensors is configured to measure atmospheric pressure at its respective location.

21. The method as recited in claim 12, wherein the comparing the first pressure measurement to a reference pressure measurement comprises:
determining, by the computer system, a difference between the first pressure measurement and the reference pressure measurement, wherein the reference pressure measurement comprises an average of pressure measurements received by the computer system from a plurality of pressure sensors in the building, wherein each of the plurality of pressure sensors is configured to measure atmospheric pressure at its respective location.

22. The method as recited in claim 12, wherein the comparing the first pressure measurement to a reference pressure measurement comprises:
determining, by the computer system, a difference between the first pressure measurement and the reference pressure measurement, wherein the reference pressure measurement comprises a second pressure measurement received from a reference device located remotely from the window.

23. An electronic security system for detecting window movement in a building, the electronic security system comprising:

a communication means for communicating with a pressure sensor, the pressure sensor coupled with a movable portion of a window in the building and configured to measure atmospheric pressure;

a processor configured to:
receive, through the communication means, a first pressure measurement from the pressure sensor coupled with the movable portion of the window, wherein the first pressure measurement provides atmospheric pressure at the pressure sensor;
compare the first pressure measurement to a reference pressure measurement to determine a difference, wherein the reference pressure measurement is measured by a source other than the pressure sensor; and
responsive to the difference exceeding a threshold, detecting that the movable portion of the window has moved.

24. The electronic security system of claim 23, wherein the communication means is further for communicating with a plurality of additional pressure sensors associated with the building, wherein each of the plurality of additional pressure sensors is configured to measure atmospheric pressure at its respective location.

25. The electronic security system of claim 23, wherein the processor is further configured to:
determine an amount of opening of the movable portion of the window based on a magnitude of the difference.

26. The electronic security system of claim 25, wherein the processor is further configured to:
trigger an alarm in response to the amount of opening of the movable portion of the window exceeding the threshold.

27. The electronic security system of claim 25, wherein the processor is further configured to:
allow arming of the electronic security system based on the amount of opening not exceeding the threshold; and
disallow arming of the electronic security system based on the amount of opening exceeding the threshold.

28. The electronic security system of claim 23, wherein the processor is further configured to:
activate an inertial sensor coupled to the moving portion of the window in response to the detecting that the movable portion of the window has moved;
receive an inertial measurement from the inertial sensor; and
validate the detection that the movable portion of the window has moved in response to the inertial measurement indicating movement of the movable portion of the window.

29. The electronic security system of claim 23, wherein the processor is a portion of a voice activated virtual assistant.

* * * * *